United States Patent [19]
Blunier et al.

[11] Patent Number: 5,113,677
[45] Date of Patent: * May 19, 1992

[54] APPARATUS AND METHOD FOR SELECTIVELY FORMING A THICKENED EDGE ON A PLATE OF FORMABLE MATERIAL

[75] Inventors: Dennis L. Blunier, Danvers, Ill.; Phillip J. Shankwitz, Raleigh, N.C.; Maurice L. Caudill, Peoria, Ill.; Paul D. Andreson, Mishawaka, Ind.; Richard R. Kazmierzak, South Bend, Ind.; Joel C. Schweisberger, Granger, Ind.

[73] Assignee: Caterpillar Inc., Peoria, Ill.

[*] Notice: The portion of the term of this patent subsequent to Jun. 18, 2008 has been disclaimed.

[21] Appl. No.: 698,009

[22] Filed: May 9, 1991

Related U.S. Application Data

[63] Continuation-in-part of Ser. No. 354,187, May 19, 1989.

[51] Int. Cl.⁵ .................. B21B 37/14; B21B 39/34; B23C 1/12; G06F 15/46
[52] U.S. Cl. .................................. 72/7; 72/24; 72/27; 72/305; 72/318; 72/417; 72/421; 72/446; 228/173.6; 364/474.09; 409/140; 409/208; 409/227
[58] Field of Search ............. 51/2 G, 2 AA, 5 A, 78, 51/80 A, 99, 165.71, DIG. 15; 72/7, 21, 22, 24, 27, 28, 207, 210, 211, 227, 252, 293, 296, 297, 305, 318, 341, 377, 405, 417, 418, 420, 421, 441, 446, 464; 228/173.1, 173.6, 173.7; 364/472, 474.01, 474.02, 474.06, 474.09, 474.25, 474.29, 474.34, 474.35

[56] References Cited

U.S. PATENT DOCUMENTS

| | | |
|---|---|---|
| 68,936 | 9/1867 | Baines . |
| 98,807 | 1/1870 | Sellers . |
| 910,471 | 1/1909 | Fraser et al. . |
| 917,765 | 4/1909 | Hoskins . |
| 936,109 | 10/1909 | Fraser et al. . |
| 1,040,398 | 10/1912 | Parmelee . |
| 1,109,521 | 9/1914 | Fraser . |
| 1,963,724 | 6/1934 | Taylor . |
| 2,063,798 | 12/1936 | Firth . |
| 2,184,150 | 12/1939 | Parker et al. ............... 76/104 |
| 2,993,393 | 7/1961 | Kendall ...................... 72/27 |
| 3,055,241 | 9/1962 | Hedgecock et al. . |
| 3,336,778 | 8/1967 | Follrath ..................... 72/203 |
| 3,400,566 | 9/1968 | Gauer ......................... 72/199 |
| 3,402,586 | 9/1988 | Muller ........................ 72/227 |
| 3,566,656 | 3/1971 | Matsumoro ................ 72/227 |
| 3,602,022 | 8/1971 | Conrad et al. ............... 72/40 |
| 3,922,951 | 12/1975 | Linsinger ..................... 409/138 |
| 3,977,298 | 8/1976 | Linsinger ..................... 51/78 |
| 4,555,921 | 12/1985 | Matsuda et al. .............. 72/224 |
| 4,565,081 | 1/1986 | Massee ......................... 72/22 |
| 4,608,654 | 8/1986 | Schafsteller .................. 364/474.01 |
| 4,648,762 | 3/1987 | Hall et al. ..................... 409/138 |
| 4,658,615 | 4/1987 | Mitchell ........................ 72/16 |
| 4,944,080 | 7/1990 | Blumbach et al. ............. 409/140 |
| 4,966,209 | 10/1990 | Worley .......................... 144/134 R |
| 4,993,896 | 2/1991 | Dombrowski et al. ......... 409/138 |
| 5,024,074 | 6/1991 | Blunier et al. ................. 72/16 |

FOREIGN PATENT DOCUMENTS 0175034 7/1990 Japan ........................... 72/24

Primary Examiner—Lowell A. Larson
Assistant Examiner—Thomas C. Schoeffler
Attorney, Agent, or Firm—Alan J. Hickman

[57] ABSTRACT

In conventional fabrication manufacture the thickness of the steel plates are often determined by the metal section required at the weld joints. The subject apparatus and method overcomes this problem by selectively forming a thickened edge along the edge of a thinner steel plate which can now be limited to the thickness required to withstand the stresses on the fabrication. The thickened edge is produced by passing a plate supported on a table through a forming apparatus having a forming roller. The table is movable in an oblique direction relative to the plate so that the shape of the thickened edge may be varied. The forming apparatus and table are automatically controlled to produce a thickened edge of a desired shape intermittently or continuously along a linear or non-linear edge of the plate.

34 Claims, 14 Drawing Sheets

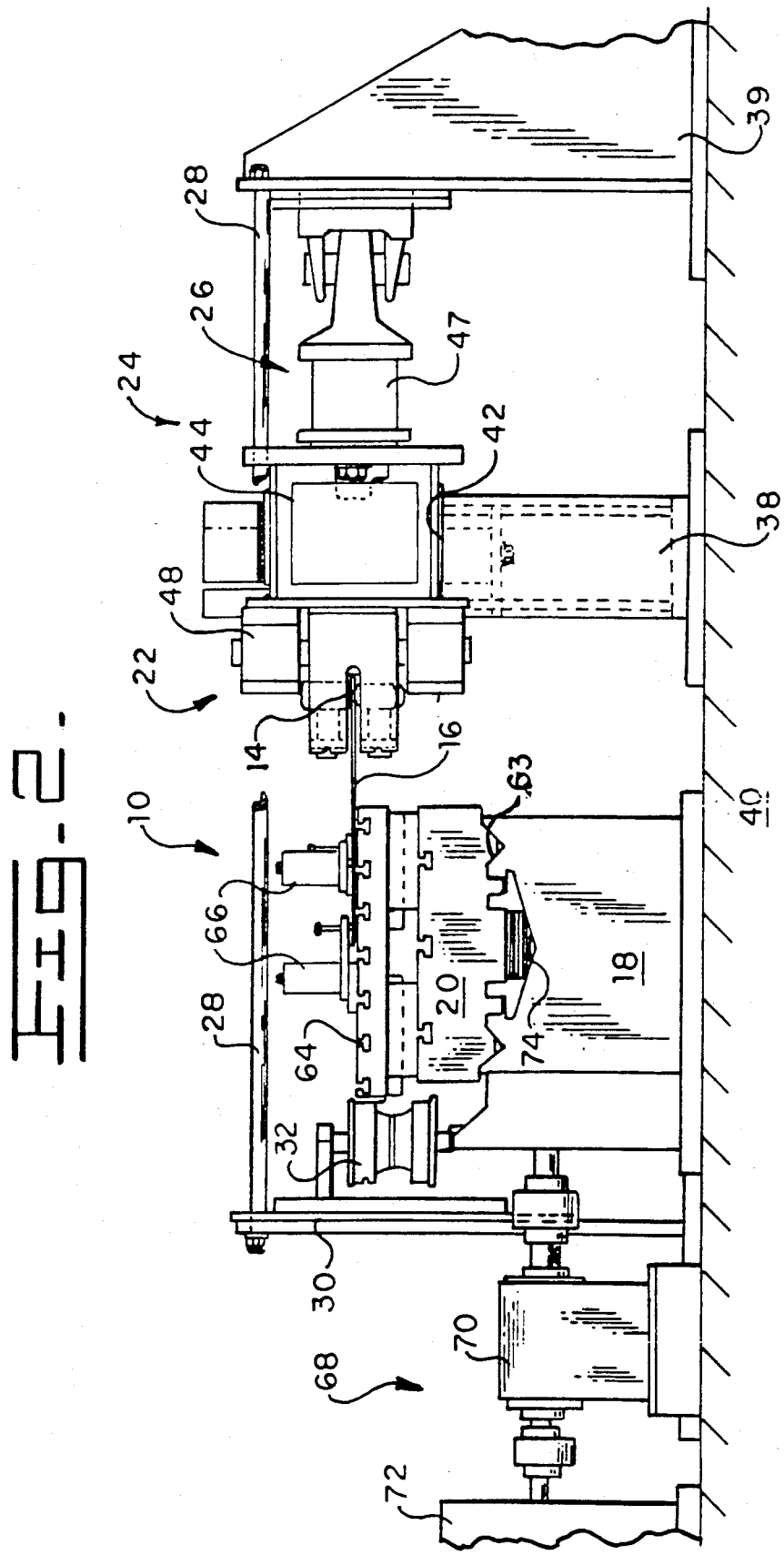

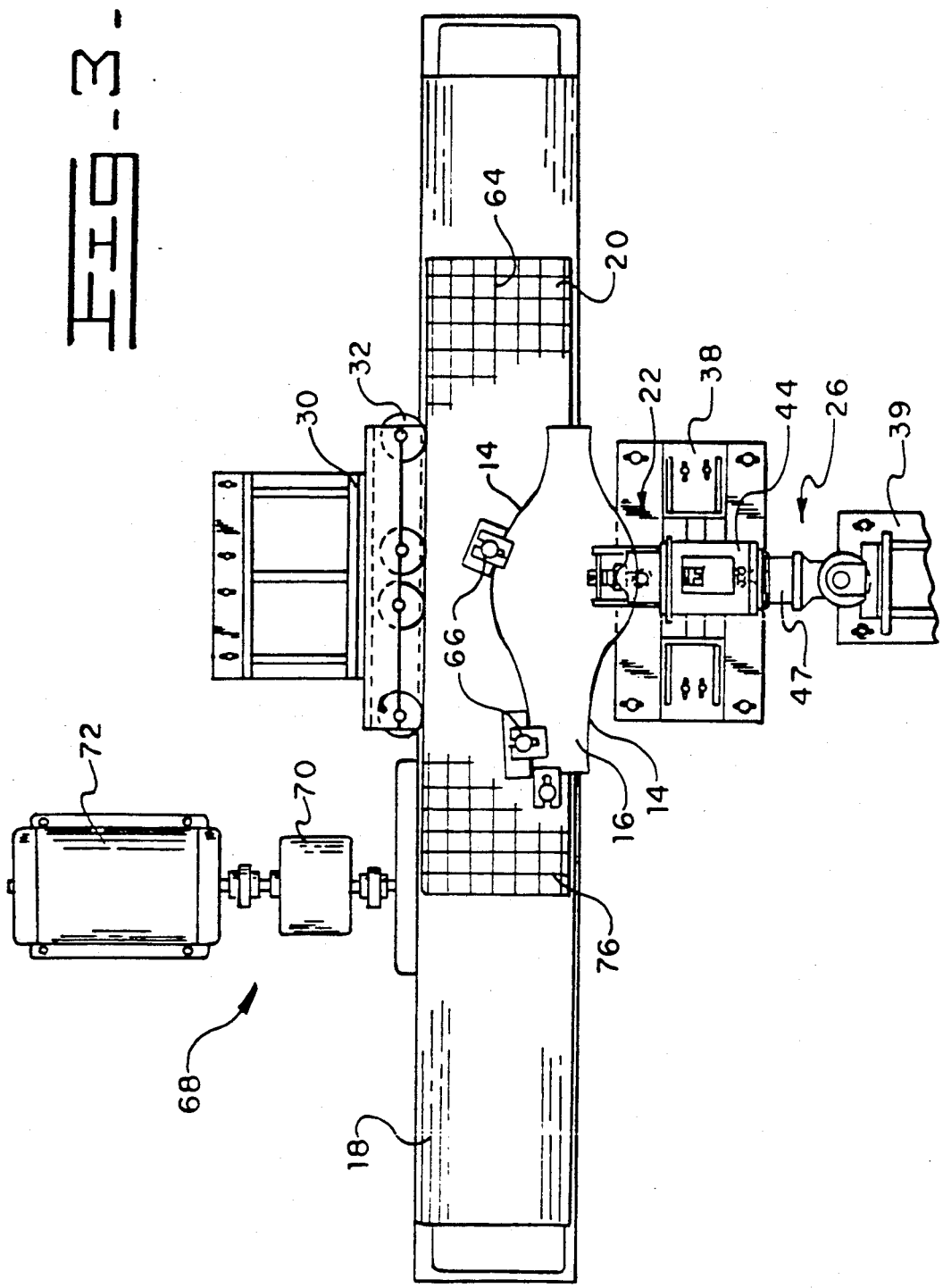

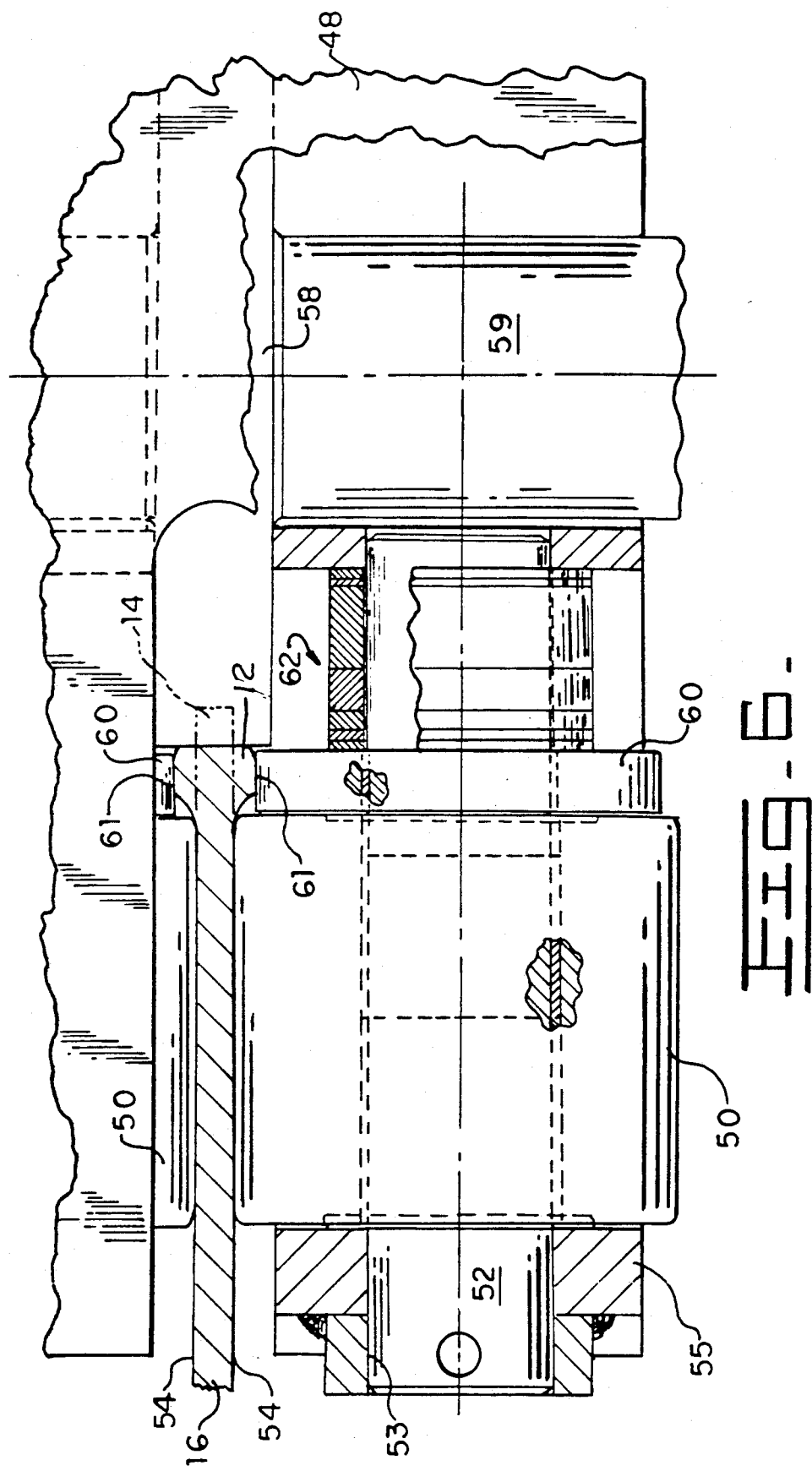

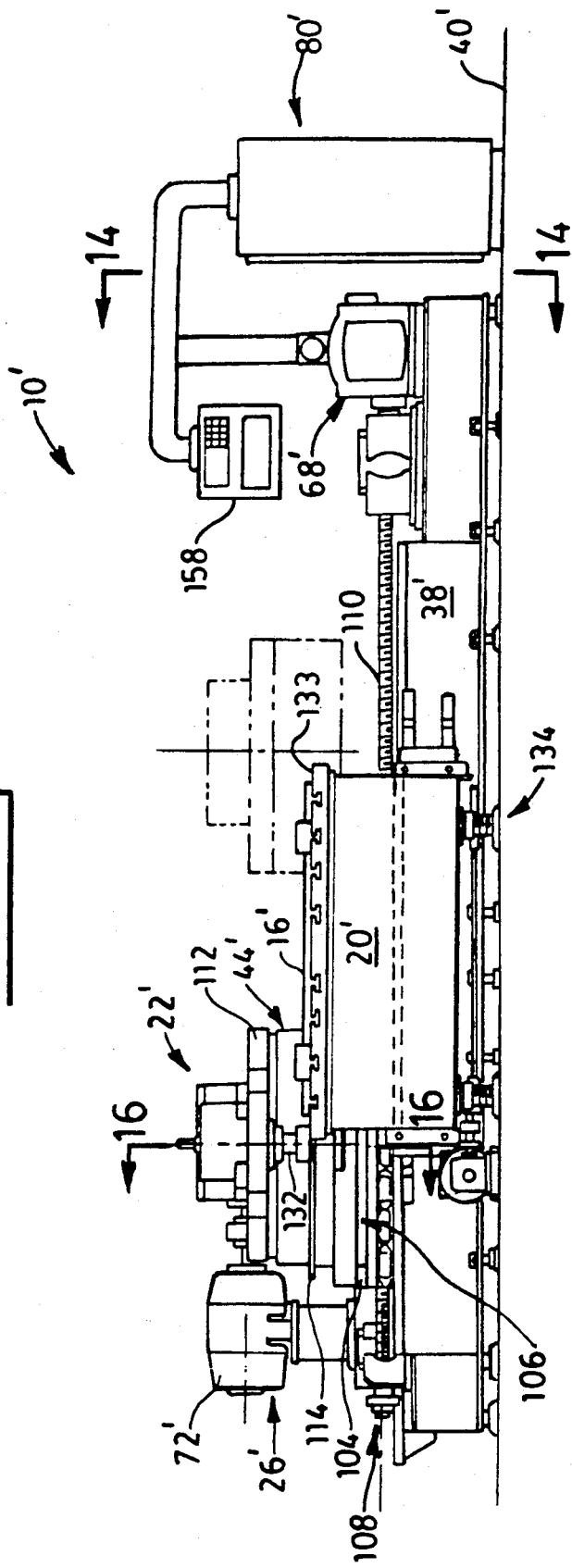

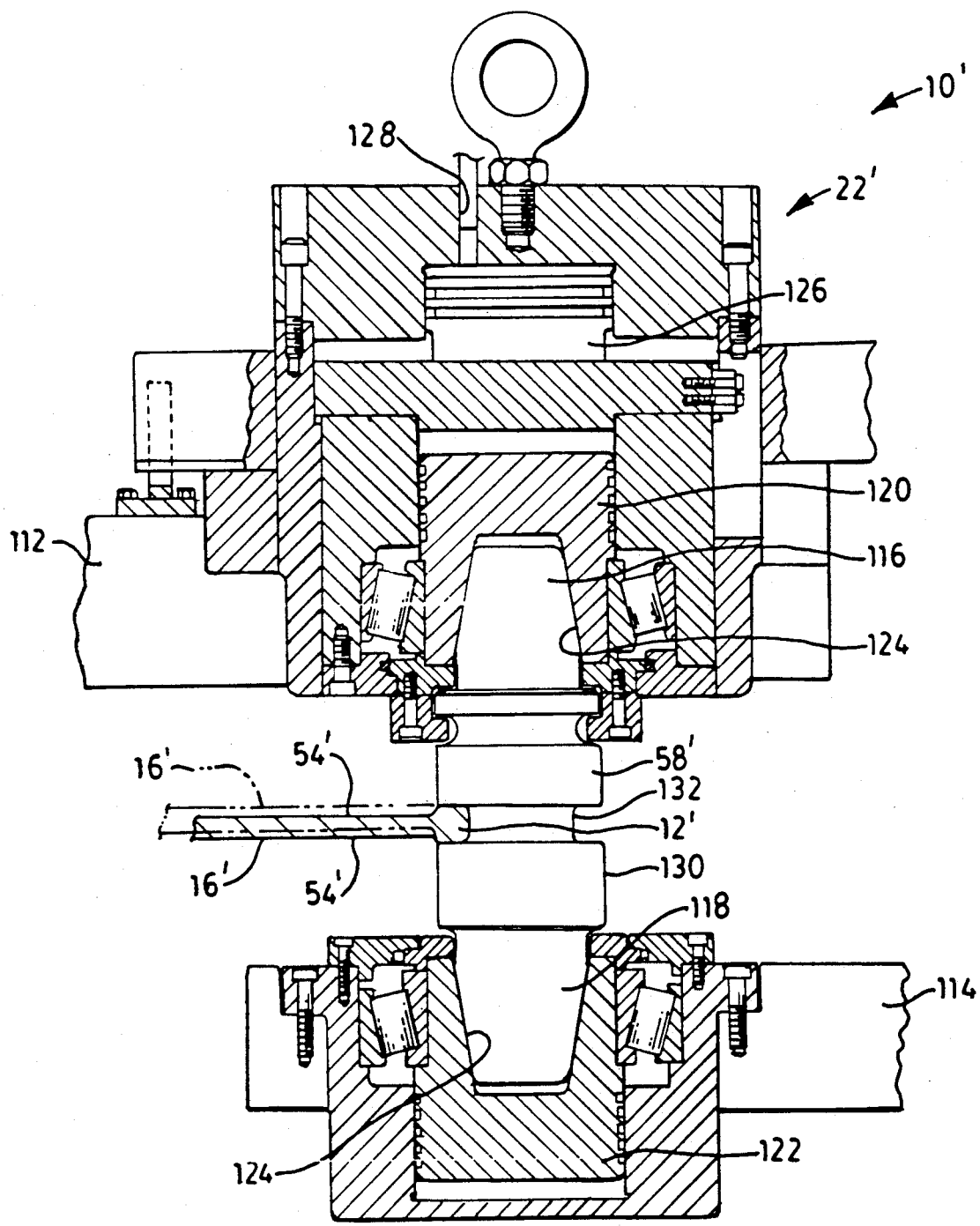

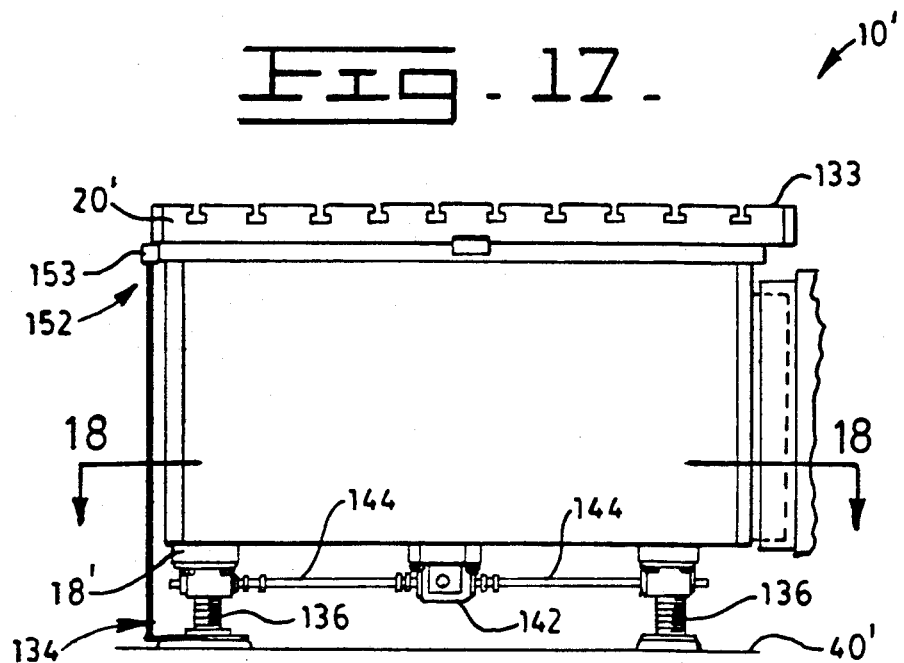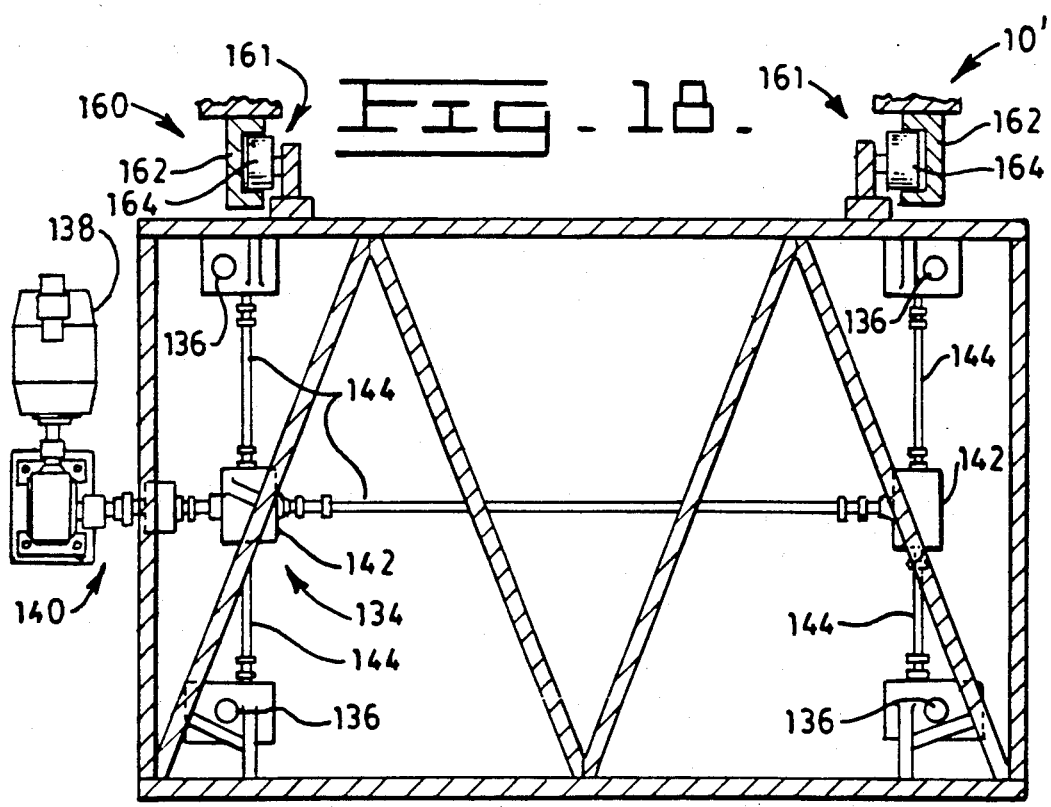

APPARATUS AND METHOD FOR SELECTIVELY FORMING A THICKENED EDGE ON A PLATE OF FORMABLE MATERIAL

CROSS-REFERENCE TO RELATED APPLICATIONS

This is a continuation-in-part of Ser. No. 07/354,187, filed May 19, 1989.

DESCRIPTION

1. Technical Field

This invention relates to an apparatus and method for selectively forming a thickened edge on a plate of formable material and more particularly to an apparatus for automatically varying the position of a forming apparatus relative to the plate during crosswise movement of the plate relative to the forming apparatus.

2. Background

A substantial portion of many construction machines consists of large fabrications which are manufactured by welding several different shaped metal plates of steel together. Due to the physics of the welding process, the section of material required to make the weld joint as strong as the plate must be thicker than the rest of the plate in most instances. As shown by FIG. 11 of the patent drawings, stress concentration immediately adjacent to the weld can cause a weakened area at the joint resulting in structural failure to the fabrication.

The conventional cure for this problem is to use a thicker plate to increase the section of material at the weld joint. This in turn creates the added problems of needlessly increasing the weight of the fabrications since the entire plate is thicker than necessary. This causes attaching problems with other components resulting in a chain of events resulting in increasing their size, i.e., larger bolts, bigger bolt mountings, increased sizes of castings, etc. This chain of events results in the major problems of increasing machine size and weight; using more material, further reducing the availability of such material; and increasing the cost of the machines. This ultimately results in higher cost of roads, dams, etc.

In addition to the deficiencies explained above, there is also the problem of maintaining a variable load on the forming rollers as they move along the edge of an irregular shaped plate to provide a constant pressure of the forming rollers along a line of force perpendicular to the edge being worked. If a substantially constant pressure in a direction normal to the edge cannot be maintained, the section of the thickened edge would not be consistent resulting in an inadequate weld joint.

Frequently, the plate requires only intermittent weld joints to attach the formed plate to another plate or member in such applications it is desirable to have only those portions of the plate edge being welded to be thickened by upsetting the material in order to reduce cost without reducing the strength of the weldment. The ability to automatically form intermittent spaced apart thickened areas along a plate edge, whether linear or irregular, is not achievable in a cost effective manner with the prior forming devices. Therefore, previously formed plates were limited to being formed along the entire length of the plate edge.

In some applications it is desirable to have a plate which has a plurality of spaced raised areas along the edge to be formed. The forming of a plate configured such as this has been avoided in the past as cyclical or intermittent loading of the forming tool during operation would cause premature wear and failure of the forming tool.

In other applications it is desirable to be able to automatically vary the position of the forming roller relative to the edge in directions transverse the edge, crosswise of the transverse direction, and oblique the side surfaces of the plate being formed so that the edge shape and thickness may be varied to accommodate an assortment of structural fabricated assemblies. For example, it may be desirable to intermittently form the thickened edge along the length of the plate rather than continuously and/or to change the shape of the thickened edge by moving the forming roller obliquely relative to the plate side surfaces to form right or left projecting thickened edges. Preferably such forming is performed on the fly and automatically.

The assignee has unsuccessfully investigated and searched the industry to find equipment to manufacture thickened edges on the components parts of fabricated assemblies with capabilities as discussed above. A search of the United States Patent and Trademark Office was also unsuccessful in discovering any references which teach an apparatus for forming a thickened edge along a plate having the capabilities discussed above.

The present invention is directed to overcome the problems as set forth above.

DISCLOSURE OF THE INVENTION

In one aspect of the present invention, a method of selectively forming a thickened edge on a plate of formable metallic material by working an edge of the plate into a prescribed thickness and shape with a forming apparatus is provided. The forming apparatus is movably carried on a support and the plate is held on a table located adjacent the forming apparatus. The forming apparatus and plate are automatically controllably movable relative to each other. The method comprises the steps of: moving one of the forming apparatus and table in a direction transverse the plate edge to a preselected transverse coordinate position; moving one of the forming apparatus and table in a direction crosswise of the transverse direction and forming the thickened edge on said plate; sensing a crosswise coordinate position of the forming apparatus as the one of the forming apparatus and table move in the crosswise direction; determining a transverse coordinate position of the forming apparatus corresponding to the sensed crosswise coordinate position of the one of the forming apparatus and table; and moving the one of the forming apparatus and table transversely to the determined transverse coordinate position during relative crosswise movement of the forming apparatus and plate.

In another aspect of the present invention, an apparatus for selectively forming a thickened edge on a plate of formable metallic material having an edge is provided. A table having a top surface supports the plate on the table top surface and a clamp retains the plate at a preselected location on the table surface and from movement relative to the table top surface. A forming apparatus is connected to a support and engageable with the plate edge to form a thickened plate edge. A first guide is provided for guiding one of the table and forming apparatus for movement in directions transverse the plate edge and a second guide is provided for guiding one of the table and forming apparatus in directions crosswise of the transverse movement. A load applying device applies a force to one of the forming apparatus and table and moves the one of the forming apparatus and table in the transverse directions. A drive device moves one of the forming apparatus and table in the crosswise directions. A sensor senses crosswise coordinate positions of the plate relative to the forming apparatus and delivers a responsive crosswise coordinate signal. A control having a processor receives the crosswise coordinate signal, determines a corresponding transverse coordinate position of the forming apparatus relative to the plate based on an edge profile map stored in a memory of the processor and the crosswise coordinate position, and delivers a responsive transverse control signal. The load applying device moves the one of the forming apparatus and table transversely to the corresponding coordinate position in response to receiving the transverse control signal.

In yet another aspect of the invention, the apparatus as set forth above comprises third device for guiding one of the table and forming apparatus in directions oblique relative to an outer surface of the plate, a lift device for moving the one of the forming apparatus and table in the oblique directions, and a sensors for sensing crosswise, transverse and oblique coordinate positions of the plate relative to the forming apparatus and delivering responsive crosswise, transverse and oblique coordinate signals. A control device receives the crosswise, transverse, and oblique coordinate signals, processes the signals in accordance with preprogrammed instructions, and delivers responsive transverse and oblique control signals. The load applying and lift devices receive the respective control signals and move the forming apparatus to a predetermined transverse position and the one of the forming apparatus and table to a predetermined oblique position corresponding to the crosswise position. The corresponding transverse and oblique positions are determined as a function of an edge profile map stored in memory.

The foregoing and other aspects of the invention will become apparent from the following detailed description when considered in conjunction with the accompanying drawings. It is expressly understood, however, that the drawings are not intended as a definition of the invention but are for the purpose of illustration only.

BRIEF DESCRIPTION OF THE DRAWINGS

FIG. 2 is an elevational view of a preferred form of the apparatus with some areas broken away;

FIG. 3 is a partial plan view of the apparatus of FIG. 2 illustrating the relationship of the table, work piece and forming apparatus;

FIG. 6 is a further enlarged view of the rollers set in modified position to produce a thickened edge of a different shape with areas broken away to disclose bearings, adjustment shims, etc.;

FIG. 8 is a schematic view of various shapes and sizes of forming rollers that can be interchanged to produce various shaped thickened edges;

FIG. 13 is a front elevational view of another embodiment of the apparatus for forming a thickened edge on a plate;

FIG. 16 is a crossection view taken along lines 16—16 of FIG. 13 showing a portion of the forming apparatus in greater detail;

FIG. 17 is a side elevational view of the table on which the plate is supported;

FIG. 18 is a sectional view taken along lines 18—18 of FIG. 17 showing the lift means in greater detail.

BEST MODE CARRYING OUT THE INVENTION

Figure 1:
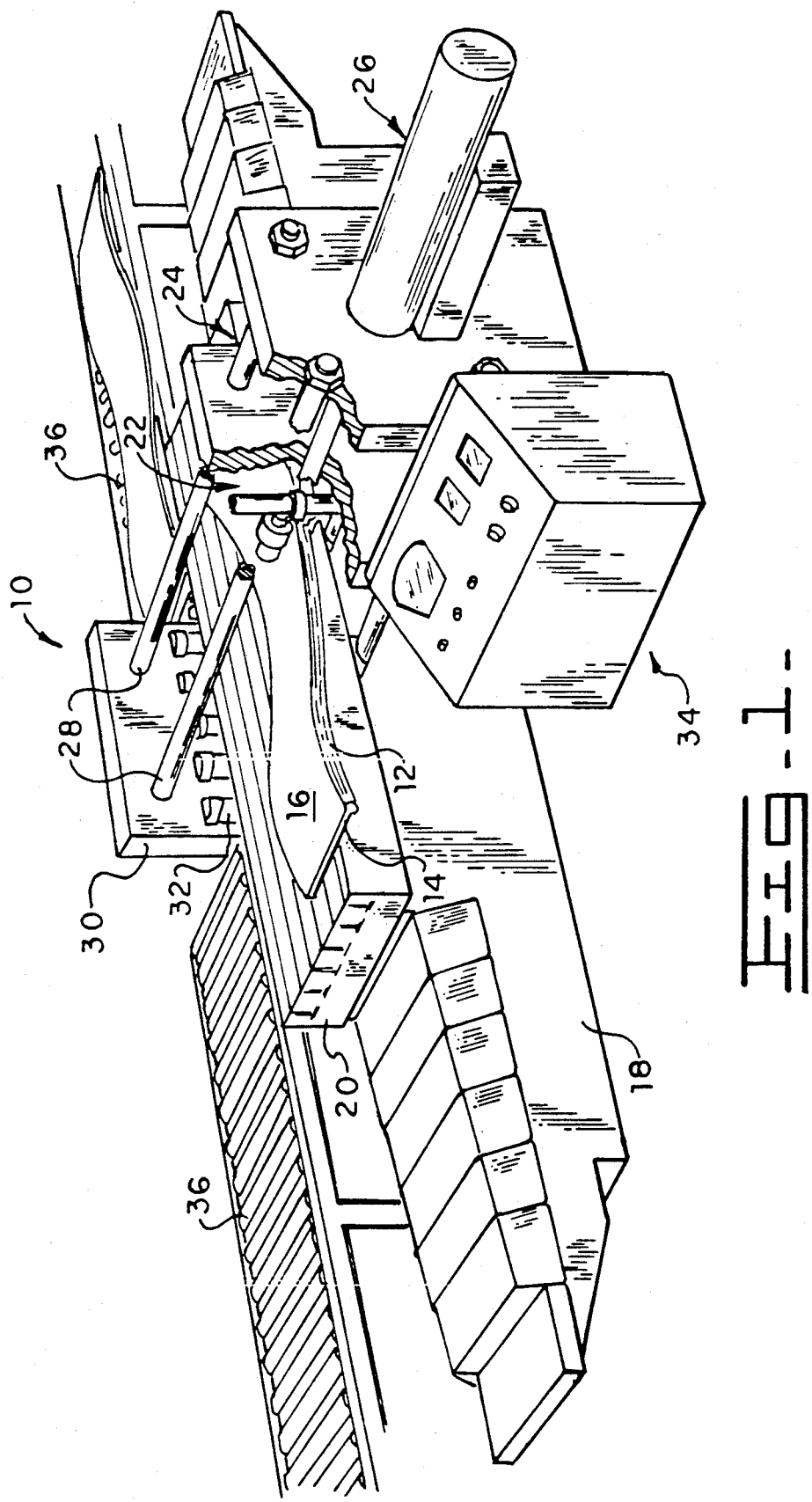
FIG. 1 is a perspective view of an apparatus embodying the present invention.

In the perspective view of FIG. 1, a general arrangement of an apparatus 10 for selectively forming a thickened edge 12 along the edge 14 of a plate 16 of formable material is illustrated. The apparatus 10 has a base 18 and a reciprocating support or table 20 for holding the plate 1 as the thickened edge 12 is being formed along the edge 14.

A forming apparatus 22 supported by a load frame 24 standing adjacent to the base and table, engages the edge 14 of the plate 16 to form the thickened edge 12. A load is applied to the forming apparatus 22 by a load applying means 26 also mounted in the load frame 24. The load frame 24, standing adjacent to the base and table, has tie bars 28 that extend across the table to a roller support bracket 30. Side thrust rollers 32 are rotatively mounted on the bracket 30 to engage a side of the table 20 to brace it against side loading of the forming apparatus 22 resulting from the pressure applied to the edge 14 of the plate 16. The side thrust can also be counteracted by providing side thrust bearings in machine ways between the table and base.

A control panel 34 is shown which contains the controls, described below, to control the selective forming apparatus 10.

Conveyors 36 shown in FIG. 1 provide means to carry the plates to be formed to and away from the apparatus.

Referring to FIG. 2, a slightly modified version of the apparatus 10 is shown wherein the load frame 24 has two supports 38 and 39 extending upwardly from a mounting base or floor 40. The load frame 24 is positioned to the side and adjacent to the table 20 and base 18. The base 18 is also mounted or secured to the mounting base or floor 40.

Figure 4:
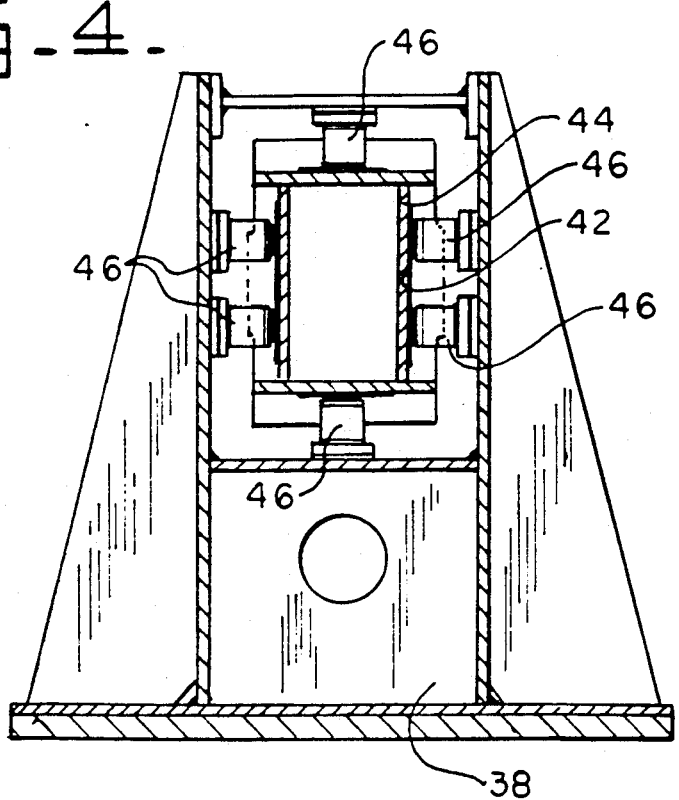
FIG. 4 is a cross sectional view taken through a support of the load frame and the slide for mounting the forming apparatus.

Mounted through a slide bearing 42, near the top of the support 38, is a slide frame 44. The details of the bearing and slide arrangement can better be seen in FIG. 4 which is a section taken through the slide 44. The bearing 42 is mounted within the support 38 wherein adjustable bearing members 46 are mounted. These adjustable bearing members are provided to maintain a close fitting relationship between the slide 44 and the support 38. Since they are adjustable, they can be adjusted to control the position of the forming apparatus 22 with respect to the edge 14 of the plate 16.

Referring back to FIG. 2, the load applying means 26 includes a motor or hydraulic cylinder 47, which applies the load to the slide frame 44, attached to one end of the slide frame 44 and anchored to the support 39 of the load frame 24.

Figure 5:
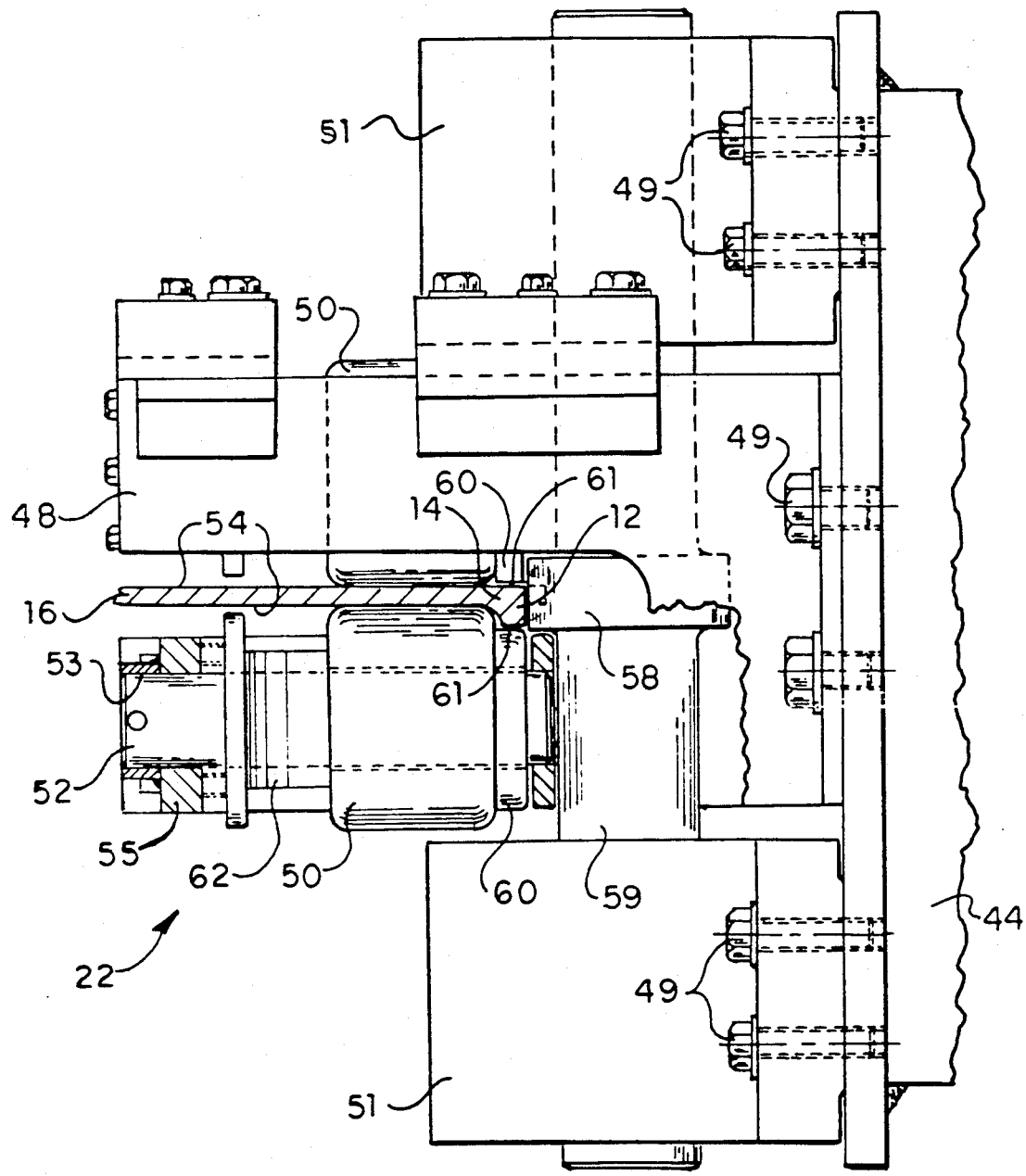
FIG. 5 is an enlarged view of the forming apparatus illustrating the relationship and mounting of the rollers.
Figure 7:
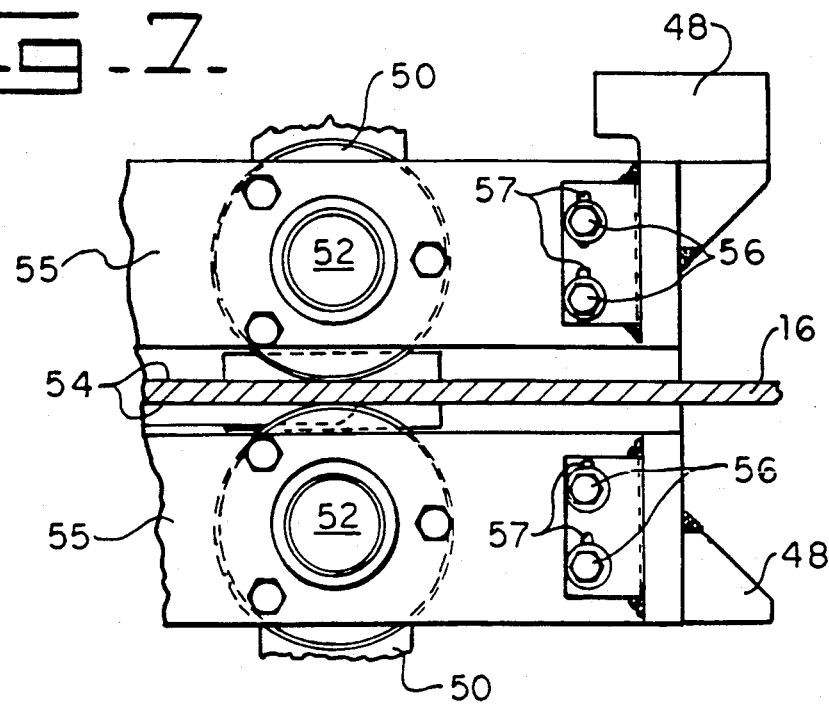
FIG. 7 is an enlarged view showing the relationship between the anti-buckling rollers and the plate and means for adjusting the pressure between the rollers and the plate.
Figure 4:
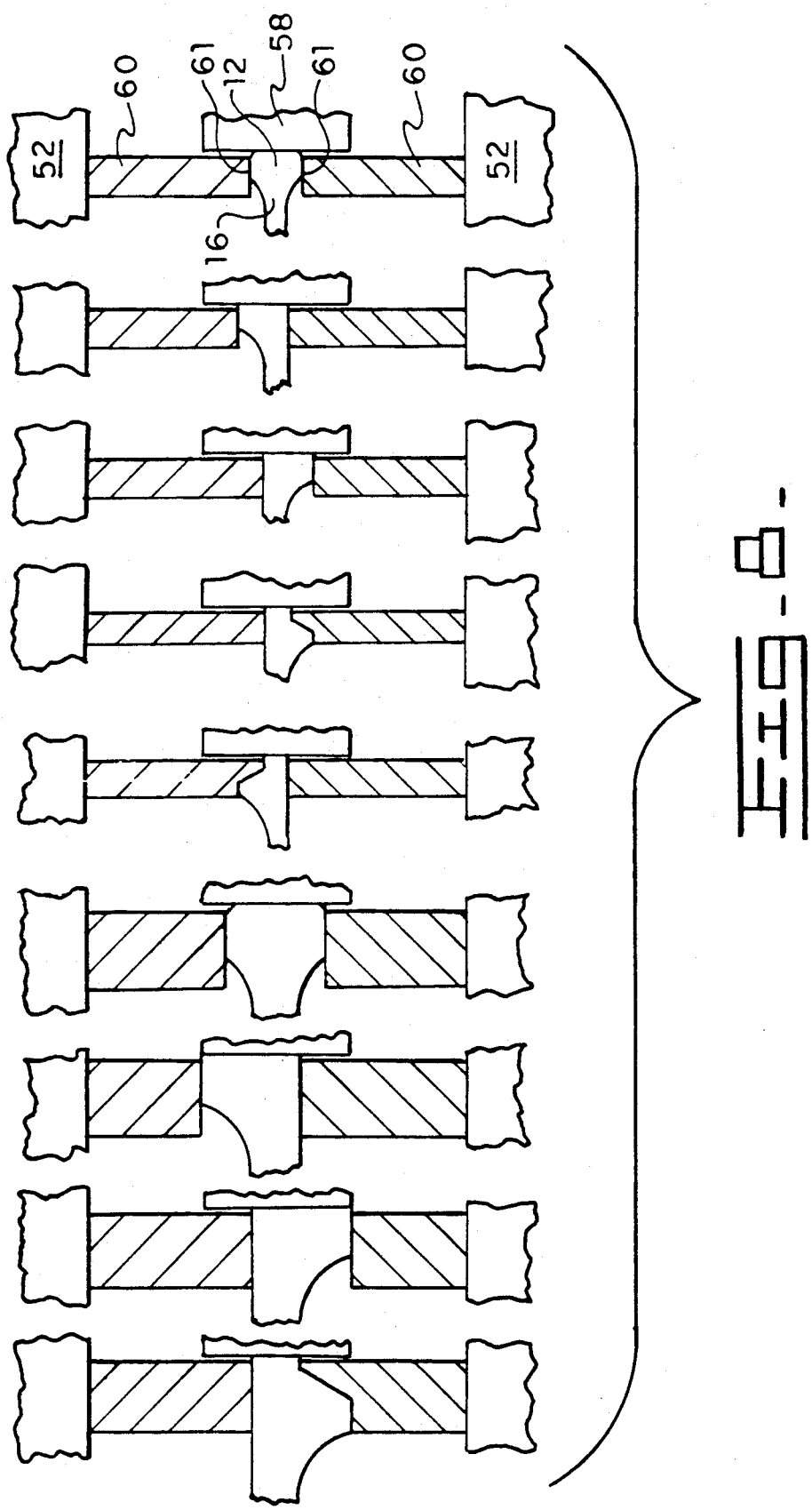

The forming apparatus 22 is attached at the opposite end of the slide frame 44 where it is accessible to the edge 14 of the plate 16 supported on the table 20. The forming apparatus details can better be seen in FIG. 5, 6 and 7. The forming apparatus 22 is reversibly mounted to the slide frame 44 by brackets 48 and pillow blocks 51 secured thereto with fasteners 49. Anti-buckling rollers 50 are rotatively mounted on shafts 52, only one of which is shown by a lower broken away portion of the bracket 48. The shafts 52 are mounted in bores 53 of a bracket 55.

The anti-buckling rollers 50 are mounted in a position to tightly engage both outer surfaces 54 of the plate 16. In this position, they grippingly hold the plate in the forming apparatus 22 to prevent buckling of the plate 16 as the edge 14 is being worked to form the thickened edge 12. The shafts 52 are mounted in adjustable brackets 55 attached to bracket 48 with fasteners 56 in slots 57 (see FIG. 7). The brackets can be adjusted to adapt the rollers 50 to plates 16 of different thickness.

The forming apparatus comprises a forming roller 58 mounted on a shaft 59 in the pillow blocks 51 perpendicular to the edge 14 of the plate 16. A pair of rollers 60 work in association with the forming roller 58 to control the shape of side surfaces 61 of the thickened edge 12. They are rotatively mounted on the shafts 52 adjacent to the anti-buckling rollers 50.

As can better be seen in FIG. 6, the pair of rollers 60 are independently mounted on the shafts 52 so that their speed of rotation can be different than that of the anti-buckling rollers 50. Because of different diameters of the rolling surfaces of the anti-buckling rollers 50 and the pair of side surface forming rollers 60, the independent mounting eliminates scrubbing between the rollers and the surfaces being contacted. The pair of forming rollers 60 may also be changed to accommodate different shaped edges 61 required on the thickened edge 12.

FIG. 8 schematically illustrates several combinations of side surface 61 forming rollers 60. As shown therein they are not only changed to produce different shapes on the sides of the thickened edge 12, but also are changed to accommodate different thicknesses of plates 16.

A set of shims 62 on the shafts 52 can be moved from one side of the anti-buckling rollers 50 and the pair of rollers 60 to the opposite side to adjust the axial location of those rollers with respect to different diameter forming rollers 58.

The interchanging of the different pair of rollers 60 and the utilization of different diameter forming rollers 58 and the other adjustments described above allows the forming apparatus 22 to be modified to accommodate different shapes of thickened edges 12 as well as different thicknesses of plates 16.

Referring back to FIG. 2, the relationship between the base 18 and the table 20 can be seen. The table 20 is reciprocally mounted on the base 18 by machine ways 63. In this particular modification, the table 20 has T-slots 64 on its upper surface to receive clamps 66. The clamps 66 provide the means for holding the plate 16 securely on the table 20.

The plate 16 extends outwardly beyond an edge of the table 20 where its edge 14 makes contact with the rollers of the forming apparatus 22.

The table 20 is reciprocally moved relative to the base by a drive means 68. In this particular modification the drive means 68 includes a gear reduction box 70 powered by an electric motor 72. The gear reduction box 70 provides the proper reciprocating speed for the table 20 through a table drive mechanism 74.

The horizontal relationship between the table 20, forming apparatus 22 and the work piece or plate 16 can be better seen in FIG. 3. In this view the plate 16 is shown clamped to the upper surface 76 of the table. The plate 16 has edges 14 having an irregular or non-linear shape. As set forth in the background of this application, the irregular shapes present a particular problem in the control of the forming apparatus 22 in order to maintain a constant perpendicular pressure between the forming roller 58 and the edge of the plate so as to control the shape and thickness of the thickened edge being formed.

Figure 9:
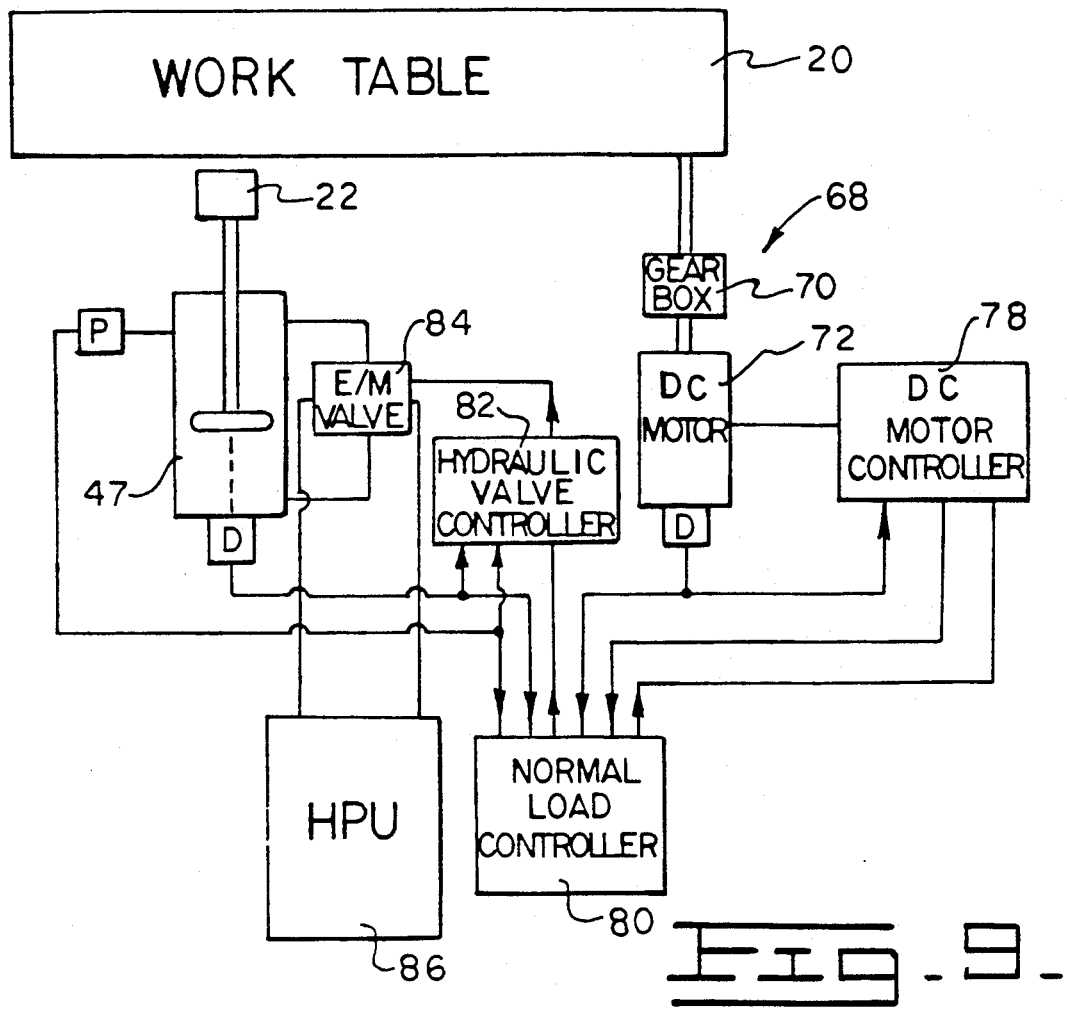
FIG. 9 is a schematic of the control for the apparatus.

The control for this apparatus is schematically shown in FIG. 9. A DC motor controller 78 controls the speed of the motor 72 that powers the drive means 68 that reciprocates the table 20 forcing the plate 16 through the forming apparatus 22. A signal from the controller 78 is sent to a normal load controller 80. This signal which is an indication of the plate's position with respect to the forming roller 58 is compared to coordinates that correspond to the non-linear edge 14 of the plate 16. This comparison is made in a processor of the controller 80 which results in automatic adjustments of the coordinate position of the forming apparatus 22 relative to the plate edge 14 based on preprogrammed instructions stored in the memory of the processor.

The normal load controller 80 produces a signal that controls a hydraulic valve controller 82 which sends a signal to the hydraulic valve 84 that controls the load cylinder or motor 47 of the load applying means 26. The hydraulic fluid is supplied by a hydraulic pump 86. This adjusts the position of the load cylinder 47 and forming apparatus 22 with respect to the edge 14 of the plate 16.

A pressure signal from the load cylinder 47 is sent back to the normal load controller 80 comparing it with the prescribed pressure that the forming apparatus 22 should be experiencing and thereby further alter the position of the forming apparatus 22. Through such means the forming apparatus 22 is continually adjusted throughout the reciprocating of the work piece or plate 16 through the forming apparatus to maintain a constant thickened edge 12 section.

Figure 10:
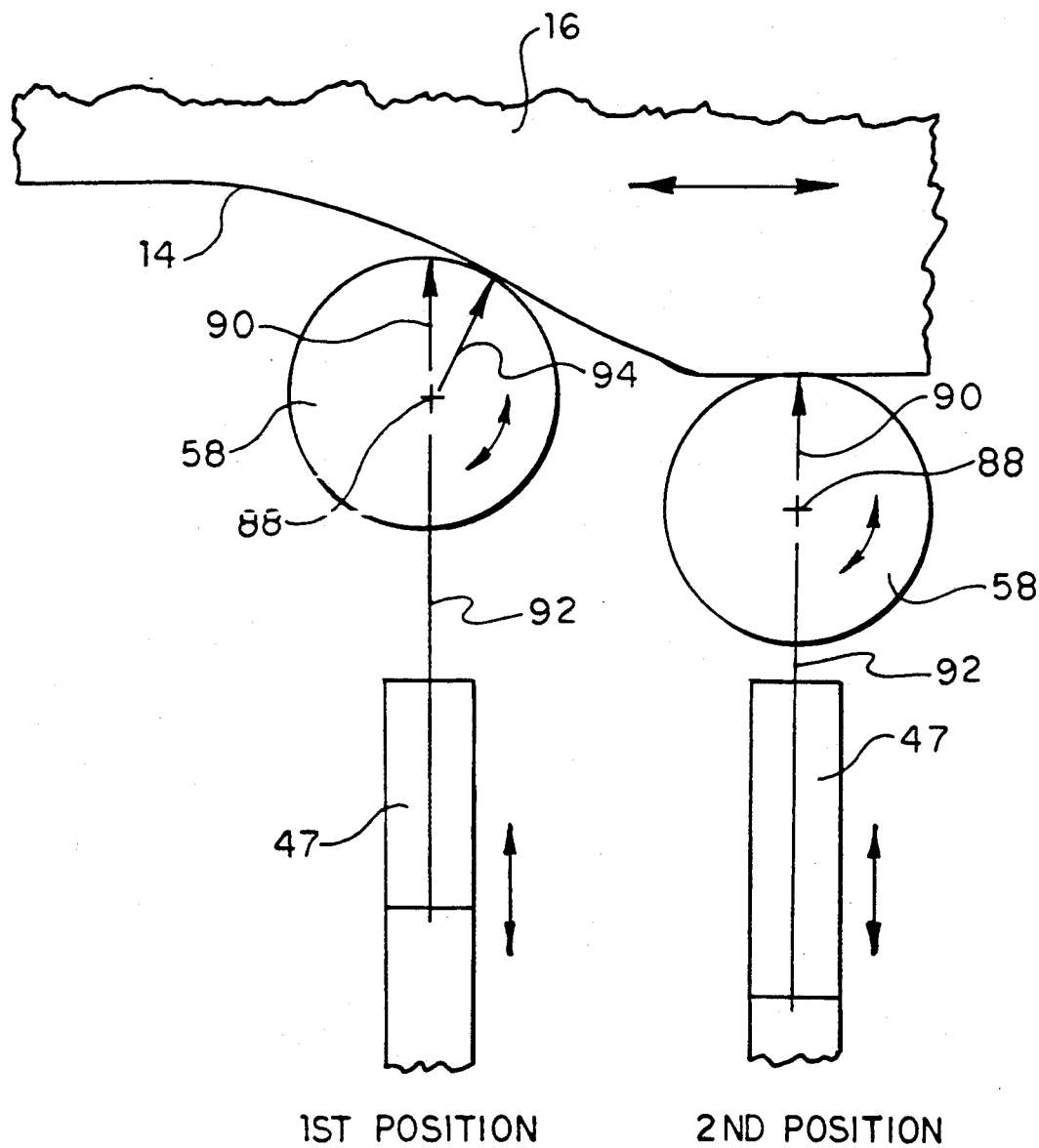
FIG. 10 is a force diagram illustrating the possible changes in the magnitude of the force required on the forming rollers along a non-linear edge.

Referring to FIG. 10, a force diagram is shown to illustrate the resultant forces experienced on the forming roller 58 of the forming apparatus 22. Due to the continuous changes of the angle of the edge 14 being presented to the forming roller, the forces between the edge 14 and the roller 58 perpendicular to an axis 88 of the roller 58 changes. As the angle of the edge 14 changes from the horizontal plane, the angle between the line of force 90 taken through the load cylinder 47 axis 92 and the angle of the resultant force taken on a line 94 between the axis 88 to a tangent point of the roller 58, i.e., perpendicular thereto, changes. Thus, the amount of pressure between the edge 14 and the forming roller 58 changes.

To counteract the decrease in force between the roller and the edge of the plate, the amount of pressure required in the load cylinder must increase to accommodate for the variation in this angle. The variation is illustrated in the first and second positions depicted and as the load roller approaches the edge that is perpendicular to the load cylinder (the second position), the pressure must again decrease to prevent the thickened edge from becoming thicker than prescribed for a particular part.

The controller may also be programmed in a manner to cause the forming apparatus to act intermittently along the edge of the plate so as to produce different shapes or only upset portions of the plate edge rather than the entire edge.

Figure 11:
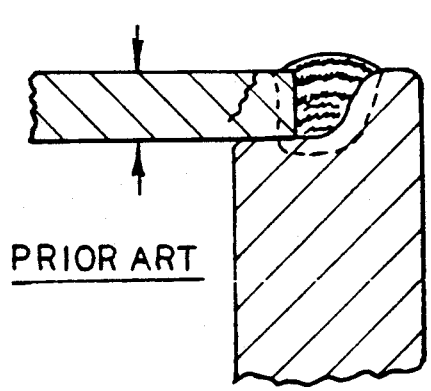
FIG. 11 is a section through a prior art weld joint.
Figure 12:
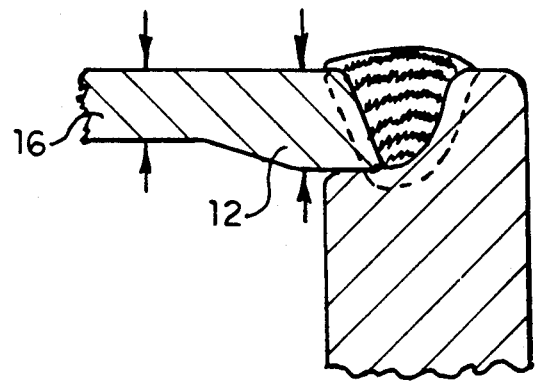
FIG. 12 is a section through a weld joint having a thickened edge produced by the apparatus and method described.

The above described apparatus can readily, selectively form a thickened edge automatically. One example is shown in FIG. 12 which is compared to the prior art of FIG. 11. A thickened edge 12 approximately fifty percent thicker than the original plate thickness is produced by reciprocating the plate through the forming apparatus 22. In this example the edge was cold formed and the forming apparatus required a load in the range of 60,000 pounds. It is to be understood that these dimensions are variables that change in accordance with the particular part, i.e., different thickness plate, different materials, edge shape requirements, etc.

This load may be reduced somewhat by zone heating the plate edge to the normal hot rolling temperature of the material which causes a reduction of the load required against the forming roller.

The plate may also be reciprocated through the forming apparatus a number of times, gradually shaping the thickened edge. This further reduces the force required from the single pass procedure.

Another embodiment of the present invention is shown in FIGS. 13-19. This embodiment is similar to the embodiments disclosed in FIGS. 1-12 in many respects. Reference to elements in FIGS. 13-19 which are functionally and/or structurally similar to those in FIGS. 1-12 will have identical Arabic reference numbers followed by a prime ('). All other elements new to FIGS. 13-19 will have Arabic numerals without a prime ('). Much of the following discussion with respect to FIGS. 13-19 also relates to the embodiments of FIGS. 1-12. Therefore, any features hereinafter discussed that are suitable for use with the embodiments of FIGS. 1-12 are to be considered included in those embodiments.

Figure 14:
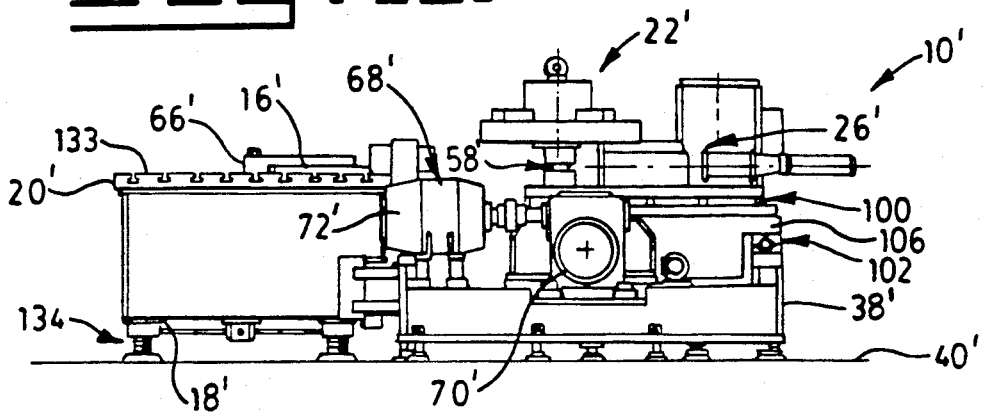
FIG. 14 is an end elevational view taken along lines 14—14 of FIG. 13.
Figure 15:
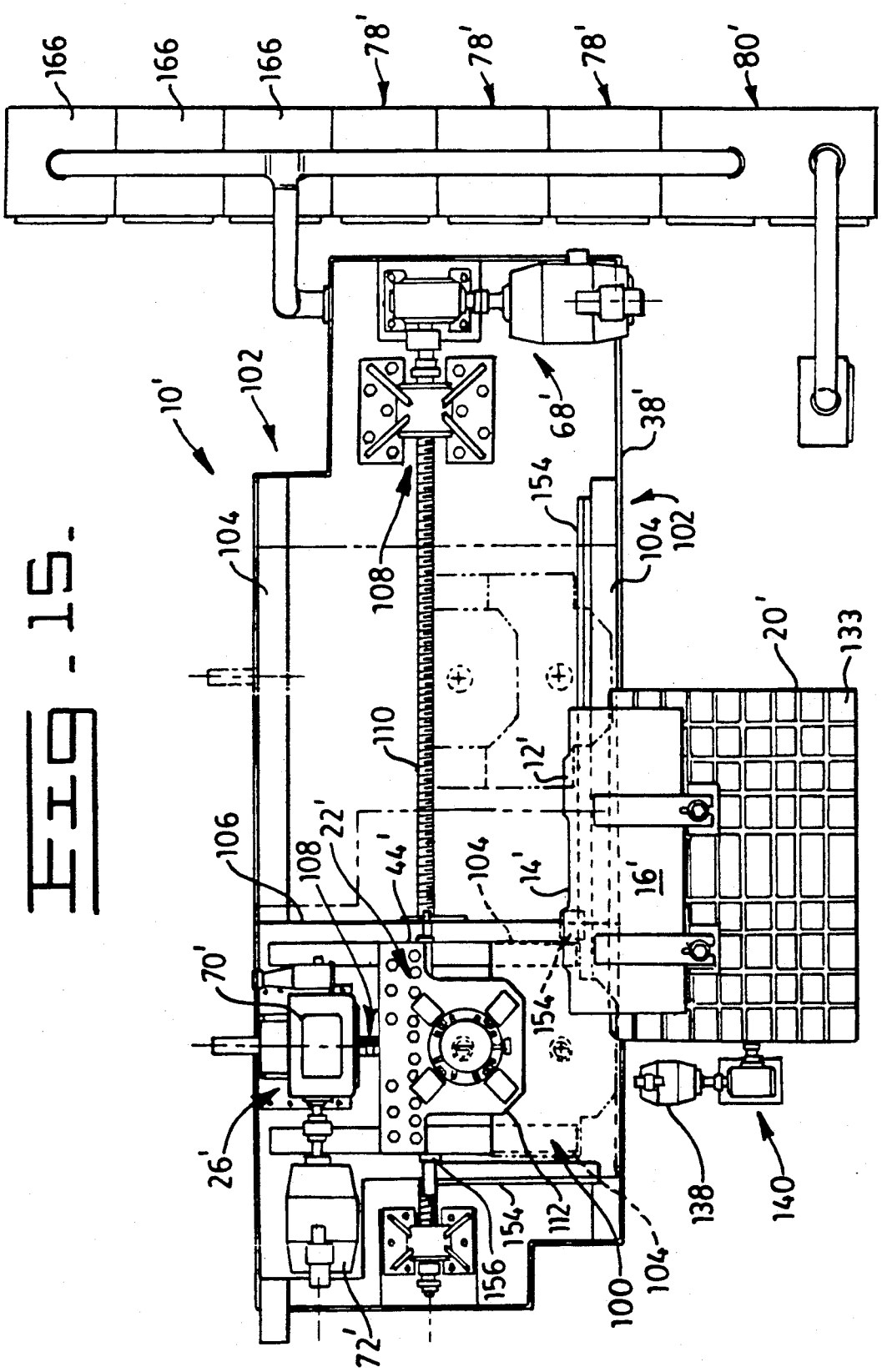
FIG. 15 is a top plan view of the apparatus of FIG. 14.

Referring to FIGS. 13-15, apparatus 10' is provided for selectively forming a thickened edge 12' along the edge 14' of a plate 16' of formable metallic material,. The apparatus 10' has a support or base 38, which carries the forming apparatus 22'. The support 38' is connected to the underlying mounting base or floor 40'.

The table 20', which is located adjacent the support 38' has base 18' for supporting the table 20' on the underlying mounting base or floor 40'. The table 20' is adapted to support the plate 16' on a table top surface 133. Clamp means 66', of any suitable design is provided for retaining the plate 16' at a preselected position on the table 20' so that the edge or a portion thereof may be formed to a preselected shape, thickness and the like. The accuracy of the plate position on the table 20' is important to the resulting quality of the formed thickened edge. It should be noted that in applications where a large number of clamps 66 are utilized it is feasible that the anti-buckling rollers 50 be eliminated.

Referring to FIGS. 13-15 and 19, a first means 100 is provided for guiding one of the table 20' and forming apparatus 22' for movement in directions transverse the plate edge 14', and a second means 102, is provided for guiding one of the table 20' and forming apparatus 22' in directions crosswise of the transverse movement. The first and second guide means 100,102 each have a pair of parallel spaced apart elongated trackways 104. The first and second pairs of trackways 104 preferably each have a plurality of bearings disposed in elongated ways and provide smooth anti-friction operation. Such guide rail assemblies are well known in the art and therefore will not be discussed in any greater detail. The second guide means 102 is mounted on a trolley 106 and guides the forming apparatus 22' supported thereon for movement in directions transverse the plate edge 14. The first guide means 100 mounts the trolley 106 on the support 38' and guides the trolley, and the forming apparatus 22' carried thereon in directions crosswise of the transverse direction of movement of the forming apparatus 22'. The transverse and crosswise directions of movement of the forming apparatus 22' and particularly forming roller 58' (FIG. 16) enables the forming roller 58' to move in a plane defined by an outer surface 54' and follow a predetermined plate edge. It is to be noted that the forming apparatus 22' moves relative to the plate 16' in the transverse and crosswise directions, however, table 20' may be movable in the transverse and crosswise directions in a similar fashion without departing from the spirit of the invention.

A load applying means 26' is provided for applying a force to one of the forming apparatus 22' and table 20' and thereby move the one of the forming apparatus 22' and table 20' in the transverse directions. Similarly a drive means 68' moves one of the forming apparatus 22' and the table 20' in the crosswise direction. The load applying and drive means 26', 68' each include an electric motor 72' and a transfer gear box 70' and a ball screw drive shaft arrangement 108. The ball screw drive shaft arrangements 108 each have a spherical ball and associated seat (not shown) and a screw threaded drive shaft 110 screw threadably connected to the ball and rotatively connected to the transfer gear box 70'. The spherical ball moves along the respective threaded drive shaft in response to rotation of the threaded drive shaft. The electric motors 72' are each connected to their respective transfer gear boxes 70' and the gear boxes 70' to the respective threaded drive shaft 110. The threaded drive shafts 110 are rotatable in response to rotation of the related electric motor 72'. The force of the forming apparatus 22' against the plate may be monitored by sensing the direct current at the motor. The control means 80' senses this current and maintains the force against the plate constant by adjusting the force in the direction of transverse movement of the forming apparatus as the direction normal to the edge 14 changes.

The ball screw drive shaft arrangement 108 of the load applying means 26' is preferably connected to the slide frame 44' of the forming apparatus 22' and the ball screw drive 108 of the drive means 68' is preferably connected to the trolley 106. The forming apparatus 22' is movable in the transverse direction in response to rotation of the drive shaft 110 associated therewith and the trolley 106 is movable crosswise of the transverse motion in response to rotation of its respective drive shaft 110. The load applying means 26' is mounted on the trolley 106 and the drive means 68' is mounted on the support 38'. The slide frame 44' of the forming apparatus 22' is supported on the trolley 106 by the first guide means 100, and the forming roller 58' is the slide frame 44' for rotation about its longitudinal axis.

The electric drive motors are preferably variable speed D.C. electric motors capable of applying a linear force in magnitudes exceeding 60,000 pounds to respective forming apparatus 22' and trolley so that a thickened edge may be formed on the plate 16'. The transfer gear boxes 70' preferably have speed reducing gear sets (not shown) which reduce the speed of rotation of the ball screw drives 108 so that the speed of travel and positioning of the forming apparatus 20' and trolley 106 may be accurately controlled. The ball screw drives 108 resist rotation when motor torque applied thereto is low or negligible so that uncontrolled or inadvertent movement of the forming apparatus 22' and the trolley 106 is prevented. Ball screw drive arrangements 108 of this type are well known in the art and therefore will not be discussed in any greater detail.

Referring to FIG. 16, the slide frame 44' includes upper and lower flanges 112,114 for supporting upper and lower shank portions 116,118 of the roller 58'. Spaced apart upper and lower socket members 120,122, are connected to the upper and lower flanges 112,114. respectively. The upper and lower socket members 120,122 each have a tapered pocket 124 and receive the tapered upper and lower shank portions 16,118 therein. A piston 126, under the influence of pressurized hydraulic fluid introduced to the piston 26 by passage 128, urges the upper socket member 120 toward the lower socket member 122 and forces the tapered upper and lower shank portions 116,118 into seated engagement with the pockets 124. This retains the roller 58' at a predetermined axial location relative to the lower flange 114, assures accuracy of positioning of the roller 58' relative to the plate outer surfaces 54' in a direction oblique the plate outer surface 54' and preloads the bearings supporting the socket members 120,122 a specified amount to maximize bearing life.

The roller 58' has a middle portion 130 located axially between the upper and lower shank portions 116,118 and an annular groove 132 disposed in radially in the middle portion and defining the shape and thickness of the edge to be formed.

Referring to FIGS. 13-15 and 17-19, a lift means 134 is provided for moving one of the forming apparatus 22' and table 20' in directions oblique to the outer surfaces 54' of the plate. The lift means 134 includes a plurality of spaced apart jacks 136 connected to and between the table 20' and floor or mounting base 40'. The jacks are preferably located adjacent the corners of the table 20' and adapted to move the table 20' relative to the forming apparatus in said oblique directions. The lift means 134 includes an electric motor 138 and a transfer gear assembly 140 connected to and between the electric motor 138 and the jacks 136. The transfer gear assembly 140 is suitable for transferring reduced speed rotary motion from the electric motor 138 to the jacks and cause extension and retraction of the jacks depending on the direction of rotation of the electric motor 138. The jacks 136 are preferably of the screw type. The transfer gear assembly 140 includes a pair of splitter boxes 142 and a plurality of drive shafts 144 which delivers rotary motion at the same speed and direction to each of the jacks 136 so that the speed of extension and retraction of each jack 136 is identical. This insures that the orientation of the plate 16 supported on the table 20' remains constant movement. The table 20' is preferably horizontal and movable in elevational directions during extension and retraction of the jacks 136. It is to be noted that the lift means 136 may also be hydraulic, pneumatic, or the like without departing from the spirit of the invention.

A sensing means 146 is provided for sensing the transverse, crosswise and oblique positions of the said ones of the forming apparatus 22' and table 20' and delivering coordinate position signals in response thereto. Specifically, the sensing means includes a crosswise sensing means 148 for sensing the crosswise coordinate position of the forming apparatus 22' relative to the plate and in the direction of crosswise travel and delivering a responsive crosswise coordinate control signal, a transverse sensing means 150 for sensing the transverse coordinate position of the forming apparatus 22' relative to the plate 16' and in directions transverse the plate edge 14' and delivering a responsive transverse coordinate signal, and an oblique sensing means 152 for sensing the oblique coordinate position of the forming apparatus 22' relative to the plate 16' and delivering an oblique coordinate signal. The crosswise and transverse sensing means 148,150 each preferably include a linear encoder, for example, model LIDA 225 manufactured by Heidenhain Corporation and the oblique sensing means preferably includes a yoyo type encoder 153 of any suitable well-known design. The linear encoders each include a linear steel tape portion 154 and a sensing head portion 156 which is adapted to read the position of the sensing head portion 156 along the length of the tape portion 154.

The tape portion 154 of the crosswise sensing means 148 is mounted on the support 38' adjacent the elongated trackway 104 second guide means 102 and extends in directions along the length of the trackway 104 associated with guiding said forming apparatus 22' in said crosswise directions. The sensing head portion 156 of the second guide means 102 is mounted on the trolley 106 at a location thereon adjacent the tape portion 154 and movable with the trolley 106 to sense the position of the trolley 106 in the transverse direction.

The tape portion 154 of the transverse sensing means 150 is mounted on the trolley 106 adjacent an elongated trackway 104 of the first guide means 100 and extends in directions along the length of the trackway 104 associated with guiding said forming apparatus 22' in transverse directions. The sensing head portion 156 of the first guide means 100 is mounted on the slide frame 44' of the forming apparatus 22' at a location adjacent the tape portion 154 and movable with the forming apparatus 22' to sense the transverse position of the forming apparatus 22 relative to the plate edge 14.

The encoder 153 (FIG. 17) of the oblique sensing means 152 is connected to and between the table 20' and a stationary portion of base 18'. The encoder senses the elevational position of the table 20' relative to the forming apparatus 22'. The elevational position of the table 20' relative to the forming apparatus 22' in proportional to the oblique position of one of the plate outer surfaces 54 relative to the annular groove 132 of the forming roller 58'. As seen in FIG. 16, this position determines the shape of the thickened edge 12' being formed during crosswise movement of the plate 16'. It is to be mentioned that the relative movement of the forming apparatus 22' and plate 16' in the oblique direction allows for greater leniency in plate 16 thickness tolerances. Because the table 20' is positionable in oblique crossing directions relative to the plate 16' it is possible to position the annular groove 132 of the roller 58 relative to the plate outer surfaces 54'.

The crosswise transverse and oblique signals are preferably representative of the coordinate position of the forming apparatus 22 in the respective directions.

A third means 160 (FIG. 17, 18) is provided for guiding one of the table 20' and forming apparatus 22' in directions oblique relative to the outer surface 54' of the plate 16'. Preferably the third means 160 slidably connects the table 20' to the support 38' and maintains the table at a preselected transverse location relative to the support 38' so that accuracy of forming a thickened edge may be maintained. The third means 160 preferably includes a pair of guide assemblies 161 disposed between and connected to the table 20 and support. The guide assemblies 161 include a pair of parallel spaced apart trackways 162 connected to one of the support 38' and table 20' and a plurality of rollers 164 connected to the other of the support 38' and table 20' and engageable with the trackways to guide the table 20' for movement in the oblique directions. It is preferred that the oblique directions of movement are elevational and perpendicular to a plane defined by the crosswise and transverse directions of movement of the forming apparatus 22'. During the forming operation the enormous forces applied to the plate 16' by the forming apparatus 22' must be resisted. The third means 160 achieves this objective by maintaining the table 20' from transverse movement during the forming operation.

Hydraulic, pneumatic, and other mechanical equivalents may replace the electric motor drive system of the embodiment of FIGS. 13-19 without departing from the spirit of the invention. It is to be noted that the lift means 134 may be manually powered by a hand crank (not shown) in applications where the oblique position of the table 20' relative to the plate 16' is changed infrequently or in applications where adjustment for plate thickness variation is the general goal.

Figure 19:
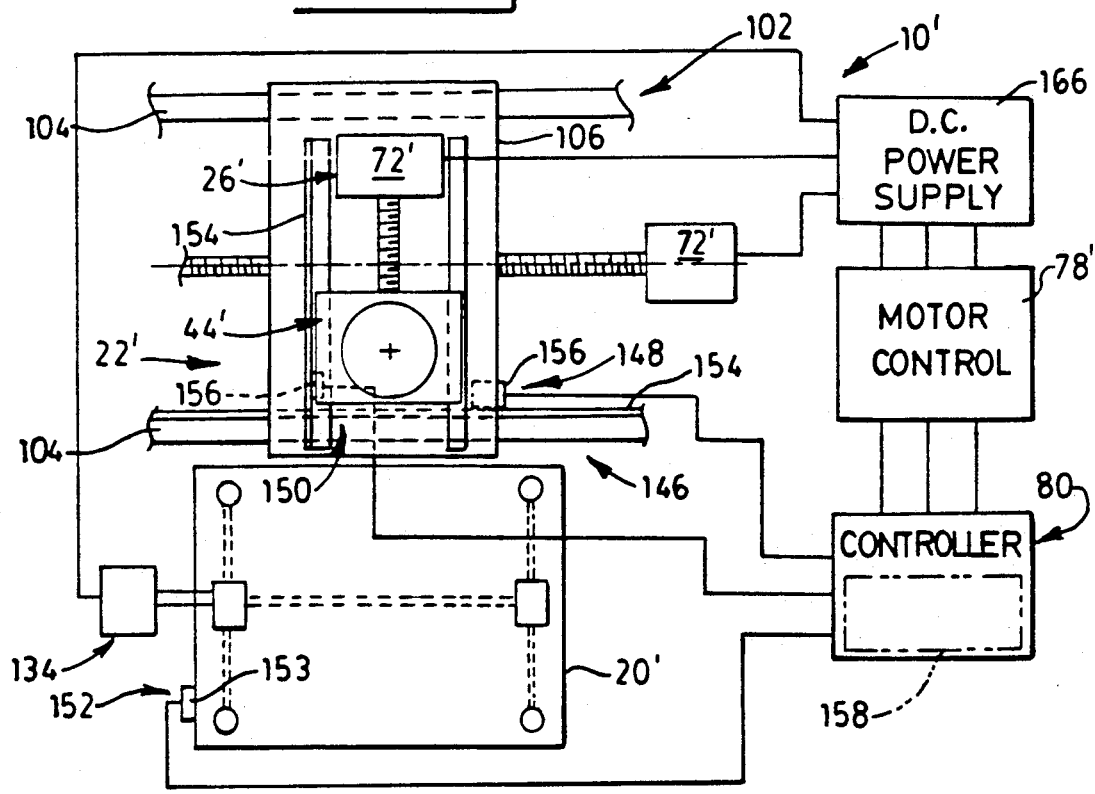
FIG. 19 is a schematic diagram of a system for controlling the edge forming operation.

As best seen in FIG. 19, control means 80' is provided for receiving the crosswise coordinate signal, determining a corresponding transverse coordinate position of the forming apparatus 22' relative to the plate 16' based on an edge profile map and the received crosswise coordinate position signal, and delivering a responsive transverse control signal, said load applying means 22' moving said one of the forming apparatus and table 20' transversely to the corresponding coordinate position in response to receiving the transverse control signal.

The control means 80' also receives the transverse, and oblique coordinate position signals from the transverse and oblique sensing means 150,152, processes the signals in accordance with preprogrammed instructions, compares the coordinate signals and with a map stored in a processor 158 of the control means 80', and delivers responsive transverse and oblique control signals. The load applying and lift means 26' and 134 receive their respective control signals and move the forming apparatus 22' to a predetermined transverse position and said one of the forming apparatus 22' and table 20' to a predetermined oblique position corresponding to the crosswise position. The corresponding transverse and oblique positions are established based on an edge profile map stored in the processors memory. The processor 158 is preferably a digital micro computer having magnetic and/or key input capabilities. The profile map stored in memory and the preprogrammed instructions can be easily upgraded or changed by simply copying or keying in the desired information.

The control means 80' preferably determines the corresponding oblique coordinate position of the forming apparatus 22' and particularly the position of the rollers annular groove 132 relative to one of the outer surfaces 54' of the plate 16' and delivers a responsive oblique position control signal. The corresponding oblique coordinate position is determined as a function of the crosswise coordinate signal and based on the profile established by said map. The lift means 134 receives the oblique position signal from the control means 80' and moves the table 20' to a position at which the relative position of the forming apparatus 22' and plate 16' is at the preselected oblique coordinate position.

Since the sensing means provides continuous feedback to the control means 80' the position of the forming apparatus 22' relative to the plate 16' may be varied during the forming operation so that the shape, length and thickness of the edge 12 being formed may be changed while the apparatus is operating. Because of the relative movement of the forming apparatus 22' and plate 16' in the three directions, transverse, crosswise and oblique, it is possible to achieve the desired formed edge on the fly without unnecessary setup stops. The three directions mentioned are preferably normal to each other.

The map preferably includes a lookup table having a plural sets of coordinates of two or three components (transverse, crosswise and oblique) defining the edge 14 configuration. Given any one coordinate position the processor accesses the lookup table, determines the other coordinates of the set and delivers signals to control appropriate ones of the load applying means 26', drive means 68' and lift means 134.

Each of the motors 72', 138 are controlled by a motor controller 78' which controls the speed and direction of rotation based on execution of the preprogrammed instructions by the processor 158. Signals based on the aforementioned preprogrammed instructions are delivered from the control means 80' to the motor controller 78'. These signals establish the direction and speed of rotation of the motors 72', 138. Feed back from the sensors 148,150,152 communicates the actual coordinate positions of the forming apparatus 22' to the processor 158 and enables the processor to guide relative movement between the plate 16 and the forming apparatus 22' along the predetermined path stored in memory. The motor controller 78' preferably includes a plurality of controllers, one for each motor 72', 138, and a transformer 166 to provide D.C. power to each of the motors 72', 138. The motor controllers are adapted to control the D.C. power delivered to the respective motors 72', 138.

The apparatus enables automatic selective forming of a thickened edge 12' on a plate 16' of formable metallic material by working an edge 14' of the plate 16' into a prescribed thickness and shape with a forming apparatus 22'. The apparatus moves one of the forming apparatus 22' and table 20' in a direction transverse the plate edge 14' to a preselected transverse coordinate position and one of the forming apparatus 22 and table 20' in a direction crosswise of said transverse direction and forms the thickened edge on the plate. The crosswise coordinate position of the forming apparatus is sensed as one of the forming apparatus and table move in the crosswise direction and the transverse coordinate position of the forming apparatus corresponding to the sensed crosswise coordinate position of the one of the forming apparatus and table is determined. One of the forming apparatus 22' and table 22' is moved transversely to the determined transverse coordinate position during relative crosswise movement of the forming apparatus 22' ad plate 16'.

The transverse coordinate position of the forming apparatus 22' during relative crosswise movement of the forming apparatus 22' and plate 16' is sensed and relative transverse movement between the forming apparatus 22' and plate 16' is stopped at said determined transverse coordinate position.

The transverse coordinate position of the forming apparatus 22' is determined by selecting a transverse coordinate position corresponding to the sensed crosswise coordinate position from a map in memory, and commanding said load applying means 26' to move one of the forming apparatus 22' and table 20' transversely toward the selected transverse coordinate position.

The control means 80' commands the load applying means to vary the transverse position of the forming apparatus 22' relative to the plate 16' during sensed relative crosswise movement of the plate 16' and forming apparatus 22' and form said thickened edge 12' in response to execution of preprogrammed instructions in said processor 158.

Crosswise movement of the forming apparatus 22' is stopped by the control means 80' in response to the sensed crosswise position of the forming apparatus 22' being at the predetermined crosswise coordinate position.

The controlling means 80' commands the lift means 134 to move the one of the forming apparatus 22' and table in a direction transverse the plate sides 54', and stops elevational movement of the forming apparatus 22' and table 20' in response to the forming apparatus 22' being at a first predetermined elevational coordinate position at which the plate edge 14' is formable in a first shape. The controlling means 80' commands the lifting means 134 to elevationally move the one of the forming apparatus 22' and table 20', during relative crosswise movement of the plate 16' and forming apparatus 22', from the first predetermined elevational position to a second predetermined elevational position at which the plate edge 14' is formable in a second shape. The shapes, as best seen in FIG. 15, are a function of the position of the outer surface 54' of the plate 16' and the relative position of the sides of the annular groove 132 of the roller 58'.

Other aspects, objects and advantages become apparent from study of the specification, drawings, and amended claims.

We claim:

1. A method of selectively forming a thickened edge on a plate of formable metallic material by working an edge of the plate into a prescribed thickness and shape with a forming apparatus, said forming apparatus being movably carried on a support and said plate being held on a table located adjacent the forming apparatus, said forming apparatus and plate being automatically controllably movable relative to each other; comprising the steps of:

moving one of the forming apparatus and table in a direction transverse the plate edge to a preselected transverse coordinate position;

moving one of the forming apparatus and table in a direction crosswise of said transverse direction and forming said thickened edge on said plate;

sensing a crosswise coordinate position of the forming apparatus at said one of the forming apparatus and table move in the crosswise direction;

determining a transverse coordinate position of the forming apparatus corresponding to the sensed crosswise coordinate position of said one of the forming apparatus and table; and moving said one of the forming apparatus and table transversely to the determined transverse coordinate position during relative crosswise movement of the forming apparatus and plate.

2. A method, as set forth in claim 1, including the steps of:

sensing a transverse coordinate position of the forming apparatus during relative crosswise movement of said one of the forming apparatus and table; and stopping transverse movement of said one of the forming apparatus and table at said determined transverse coordinate position.

3. A method, as set forth in claim 2, including a load applying means for transversely moving one of the forming apparatus and table, control means for controlling said load applying means, said control means having a memory, and wherein the step of determining the transverse coordinate position of the forming apparatus includes the steps of:

selecting a transverse coordinate position corresponding to the sensed crosswise coordinate position from a map in memory; and commanding said load applying means to move said one of the forming apparatus and table transversely toward the selected transverse coordinate position.

4. A method as set forth in claim 1, including a load applying means for transversely moving one of the forming apparatus and table, control means for controlling said load applying means, said control means having a memory, and said method including the steps of:

executing preprogrammed instructions in said memory of the control means; and commanding the load applying means to vary the transverse position of the forming apparatus relative to the plate during sensed relative crosswise movement of the plate and forming apparatus and form said thickened edge.

5. A method, as set forth in claim 1, including a load applying means for moving the forming apparatus in the transverse direction, control means for controlling said load applying means, said control means having a memory and programmed instructions in memory, said control means being connected to said load applying means, and said method including the steps of:

executing the programmed instructions in memory;

commanding said load applying means to move said forming apparatus transversely toward a determined transverse coordinate position;

sensing the transverse coordinate position of the forming apparatus; and stopping transverse movement of the forming apparatus in response to the forming apparatus being at said predetermined coordinate position.

6. A method, as set forth in claim 5, including a drive means for moving the forming apparatus in said crosswise directions, said control means being connected to said drive means and adapted to control said drive means, and including the steps of:

commanding said drive means to move the crosswise direction;

sensing the crosswise coordinate position of the forming apparatus; and stopping crosswise movement of the forming in response to the forming apparatus being at said predetermined crosswise coordinate position.

7. A method, as set forth in claim 1, wherein said plate has spaced apart sides, and including lifting means for moving one of the forming apparatus and table transversely relative to said sides, control means for controlling said lifting means, said method including the steps of:

moving said one the forming apparatus and table in a direction transversely relative to the plate sides;

sensing the coordinate position of the forming apparatus transversely relative to one of the plate sides; and stopping movement of the forming apparatus in said direction transverse the sides in response to said forming apparatus being at a predetermined elevational coordinate position relative to said one plate side.

8. A method as set forth, in claim 1, wherein said plate has spaced apart sides, a lifting means for elevationally moving one of the forming apparatus and table transverse the plate sides, control means for controlling elevational movement of said lifting means, said control means having a memory, and preprogrammed instructions in memory, and said plate having spaced apart sides, and said method including the steps of:

commanding the lifting means to move one of the forming apparatus and table in a predetermined elevational direction transverse the plate sides;

sensing the elevational coordinate position of the forming apparatus relative to the plate and delivering an elevational position signal;

receiving the elevational position signal and stopping elevational movement of said one of the forming apparatus and table in response to said forming apparatus being at a first predetermined elevational coordinate position at which the plate edge is formable in a first shape.

9. A method, as set forth in claim 8, including the step of commanding the lifting means to elevationally move said one of the forming apparatus and table, during relative crosswise movement of said plate and forming apparatus, from the first predetermined elevational position to a second predetermined elevational position at which the plate edge is formable in a second shape.

10. An apparatus for selectively forming a thickened edge on a plate of formable metallic material having an edge, comprising:

a table having a top surface and supporting said plate on said table top surface;

clamp means for retaining said plate at a preselected location on the table top surface and from movement relative to the table top surface;

a support;

a forming apparatus connected to said support and being adapted to engage said plate edge and form a thickened plate edge;

first means for guiding one of said table and forming apparatus for movement in directions transverse the plate edge;

second means for guiding one of said table and forming apparatus in directions crosswise of said transverse movement;

load applying means for applying a force to said one of the forming apparatus and table and moving said one of the forming apparatus and table in said transverse directions;

drive means for moving said one of the forming apparatus and table in said crosswise directions;

means for sensing crosswise coordinate positions of the plate relative to the forming apparatus and delivering a responsive crosswise coordinate signal;

control means for receiving said crosswise coordinate signal, determining a corresponding transverse coordinate position of the forming apparatus relative to the plate based on an edge profile map and the received crosswise coordinate position signal, and delivering a responsive transverse control signal, said load applying means moving said one of the forming apparatus and table transversely to the corresponding coordinate position in response to receiving the transverse control signal.

11. An apparatus, as set forth in claim 10, including means for sensing transverse coordinate position of the forming apparatus relative to the plate and delivering a responsive sensed transverse coordinate signal, said control means receiving the sensed transverse coordinate signal, comparing the sensed transverse coordinate position to the corresponding transverse coordinate position stored in memory, and stopping transverse movement of said one of the forming apparatus and table in response to said forming apparatus being at the corresponding transverse coordinate position relative to said plate.

12. An apparatus, as set forth in claim 11, wherein said control means being connected to the drive means and adapted to deliver a drive control signal, and said drive means receiving said drive control signal and moving said one of the forming apparatus and table in the crosswise direction in response to receiving said drive control signal.

13. An apparatus, as set forth in claim 12, wherein said edge profile map in memory defines spaced apart formed locations along the edge of said plate, said control means delivering control signals as a function of the edge profile during corresponding crosswise movement of said one of the forming apparatus and table, said load applying means receiving said control signals and moving said one of the forming means and table in transverse directions between edge forming positions at which said plate is engaged by the forming apparatus and separated positions at which said forming apparatus is spaced from said edge and forming said spaced apart thickened portions along said edge corresponding to said edge profile map.

14. An apparatus, as set forth in claim 12, wherein said edge profile map in memory defines a non-linear edge, said control means delivering control signals as a function of the edge profile during corresponding crosswise movement of said one of the forming apparatus and table, said load applying means receiving said control signals and moving said one of the forming apparatus and table in transverse directions and forming a non-linear edge along the plate corresponding to said edge profile map stored in memory.

15. An apparatus, as set forth in claim 12, including a trolley slidably connected to said support and guided for movement relative to said support in said crosswise direction, said forming apparatus having a slide frame and being slidably mounted on the trolley and guided for movement in the transverse directions, said means for sensing the relative crosswise and transverse positions of the forming apparatus and table include a pair of linear encoders, one of said encoders being connected to said trolley and sensing the relative coordinate position of the trolley in the crosswise direction and an other of the linear encoders being connected to the forming apparatus and sensing the relative transverse coordinate position of the forming apparatus.

16. An apparatus, as set forth in claim 12, wherein said forming apparatus includes:
   a slide frame slidably connected to the support frame and movable in the transverse directions;
   upper and lower spaced apart socket members each having a pocket;
   a roller having upper and lower shank portions and a middle portion, said middle portion having an angular groove defining the shape and thickness of the edge being formed, said upper end shank portion being supported in the pocket of the upper socket member and said lower shank member being supported in the pocket of the lower socket member.

17. An apparatus, as set forth in claim 16 including means for selectively urging said upper socket member toward said lower socket member and maintaining said annular groove at a preselected axial location relative to said lower socket member.

18. An apparatus, as set forth in claim 12, wherein said forming apparatus is connected to said load applying means and transversely movable in response to actuation of said load applying means.

19. An apparatus, as set forth in claim 18, wherein said forming apparatus being connected to said drive means and movable in said crosswise directions in response to actuation of said drive means.

20. An apparatus, as set forth in claim 19, including a trolley, said first and second guide means each include a pair of parallel spaced apart elongated trackways, said first pair of trackways being mounted on said trolley and said second pair of trackways being mounted on said support, said trolley being slidably supported on said first pair of trackways and movable along said first pair of trackways in said crosswise direction and said forming apparatus being slidably supported on said second pair of trackways and movable in said transverse directions.

21. An apparatus, as set forth in claim 20, wherein said load applying means and drive means each include an electric motor and a reduction gear box, said load applying means being mounted on the trolley and said drive means being mounted on the support.

22. An apparatus, as set forth in claim 20, wherein the load applying means and drive means each include a ball screw drive, said ball screw drives each having a screw threaded drive shaft and a drive motor connected to rotate the drive shaft, said screw threaded drive shaft of the load applying means being screw threadably connected to the forming apparatus and adapted to move the forming apparatus in said transverse directions in response to rotation of the load applying means screw threaded drive shaft, said screw threaded drive shaft of the drive means being screw threadably connected to the trolley and adapted to move the trolley supporting the forming apparatus thereon in said crosswise directions in response to rotation of the screw threaded drive shaft of the drive means.

23. An apparatus, as set forth in claim 10, wherein said plate has an outer surface and including lift means for moving one of the forming apparatus and table in directions oblique to the outer surface of the plate.

24. An apparatus, as set forth in claim 23, wherein said control means delivers lift control signals during relative crosswise movement between the forming apparatus and the plate based on said edge profile instructions stored in memory, said lift means receiving said lift control signals and varying the relative position of the plate outer surface and forming apparatus in said oblique directions and thereby controlling the shape of the formed edge.

25. An apparatus, as set forth in claim 23, said control means determining a corresponding oblique coordinate position of said forming apparatus relative to said plate outer surface and delivering a responsive oblique position control signal, said corresponding oblique coordinate position being determined as a function of the crosswise coordinate signal and based on said profile map, said lift means receiving said oblique position control signal and moving said one of the forming apparatus and table to a position at which the relative position of the forming apparatus and plate is at said preselected oblique coordinate position.

26. An apparatus, as set forth in claim 25, including means for sensing the oblique coordinate position of the forming apparatus relative to the plate outer surface and delivering a responsive oblique coordinate signal, said control means receiving the sensed oblique coordinate signal, comparing the second oblique coordinate position to the corresponding oblique coordinate position in memory, and stopping oblique movement of said one of the forming apparatus and table in response to said forming apparatus being at the corresponding oblique coordinate position relative to said plate outer surface.

27. An apparatus, as set forth in claim 26, wherein said lift means includes a base having a plurality of jacks, said jacks being connected to the table and adapted to move the table relative to the forming apparatus in said oblique directions, said sensing means including a linear encoder connected to one of the table and base and adapted to sense movement in said oblique directions of the table relative to the base.

28. An apparatus, as set forth in claim 23, wherein said lift means includes a base having a plurality of jacks, said jacks being connected to the table and adapted to move the table relative to the forming apparatus in said oblique directions.

29. An apparatus, as set forth in claim 28, wherein said table is movable in elevational directions in response to movement of said jacks between the extended and retracted positions.

30. An apparatus, as set forth in claim 28 wherein said lift means includes:
   an electric motor; and
   a transfer gear assembly connecting said electric motor to each of said jacks, said jacks being movable between extended and retracted positions in response to rotation of said electric motor, and said table being movable in said oblique directions in response to movement of said jacks.

31. An apparatus, as set forth in claim 30, wherein said electric motor is reversible and said jacks are screw type jacks.

32. An apparatus, as set forth in claim 28, including means for connecting said table to said support, for maintaining said table at a preselected transverse location relative to said support. and for guiding said table in said oblique directions relative to said forming apparatus.

33. An apparatus, as set forth in claim 32. wherein said connecting means includes a pair of parallel. spaced apart. elevationally oriented guide assemblies connected to and between said table and support.

34. An apparatus for selectively forming a thickened edge on a plate of formable metallic material having an edge and an outer surface, comprising:
 a table having a surface and supporting said plate on said table top surface;
 clamp means for retaining said plate at a preselected location on the table top surface and from movement relative to the table top surface;
 a support;
 a forming apparatus connected to said support and being adapted to engage said plate edge and form a thickened plate edge;
 first means for guiding said forming apparatus for movement in directions transverse the plate edge;
 second means for guiding said forming apparatus in directions crosswise of said transverse movement;
 third means for guiding one of said table and forming apparatus in directions oblique relative to the outer surface of the plate;
 load applying means for applying a force to said forming apparatus and moving said forming apparatus in said transverse directions;
 drive means for moving said forming apparatus in said crosswise directions;
 lift means for moving said one of the forming apparatus and table in said oblique directions;
 means for sensing crosswise, transverse and oblique coordinate positions of the plate relative to the forming apparatus and delivering responsive crosswise, transverse and oblique coordinate signals;
 control means for receiving said crosswise, transverse, and oblique coordinate signals, processing said signals in accordance with preprogrammed instructions, comparing the coordinate signals and with respect to a map stored in a memory, and delivering transverse and oblique control signals in response thereto, said load applying and lift means receiving the respective control signals and moving the forming apparatus to a predetermined transverse position and said one of the forming apparatus and table to a predetermined oblique position corresponding to the crosswise position, said corresponding transverse and oblique positions being established by an edge profile map stored in memory.

* * * * *

UNITED STATES PATENT AND TRADEMARK OFFICE
CERTIFICATE OF CORRECTION

PATENT NO. : 5,113,677
DATED : May 19, 1992
INVENTOR(S) : Dennis L. Blunier et al.

It is certified that error appears in the above-identified patent and that said Letters Patent is hereby corrected as shown below:

Claim 1, column 14, line 5, change "at" to --as--.

Claim 6, column 15, line 1, after "move the" insert --forming apparatus in a--.

Claim 8, column 15, line 32, insert --executing the instructions in memory-- as the second paragraph.

Signed and Sealed this

Seventh Day of September, 1993

*Attest:*

BRUCE LEHMAN

*Attesting Officer*  Commissioner of Patents and Trademarks